US011363630B2

(12) United States Patent
Zhang et al.

(10) Patent No.: US 11,363,630 B2
(45) Date of Patent: Jun. 14, 2022

(54) BANDWIDTH PART (BWP) CONFIGURATION FOR SUBBAND ACCESS IN NEW RADIO-UNLICENSED (NR-U)

(71) Applicant: QUALCOMM Incorporated, San Diego, CA (US)

(72) Inventors: Xiaoxia Zhang, San Diego, CA (US); Tamer Kadous, San Diego, CA (US); Kapil Bhattad, Bangalore (IN); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/287,893

(22) Filed: Feb. 27, 2019

(65) Prior Publication Data

US 2019/0274162 A1    Sep. 5, 2019

(30) Foreign Application Priority Data

Mar. 1, 2018    (IN) .............................. 201841007756

(51) Int. Cl.
*H04W 74/08*    (2009.01)
*H04W 72/04*    (2009.01)

(52) U.S. Cl.
CPC ....... *H04W 74/08* (2013.01); *H04W 72/0453* (2013.01); *H04W 74/0808* (2013.01)

(58) Field of Classification Search
CPC ............ H04W 16/14; H04W 72/0453; H04W 74/085; H04W 74/0808; H04W 72/0406; H04W 72/042; H04W 72/048; H04W 72/08; H04W 74/08; H04L 5/0041
See application file for complete search history.

(56) References Cited

U.S. PATENT DOCUMENTS

2017/0289967 A1    10/2017 Yu et al.
2018/0049169 A1    2/2018 Lin et al.
2018/0295651 A1*   10/2018 Cao ..................... H04W 72/14
(Continued)

OTHER PUBLICATIONS

Huawei et al., "On Uplink Hopping and DVRB", 3GPP Draft, R1-1719829, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051369552, 5 Pages, Retrieved from the Internet:URL:http://www.3gpp.org/ftp/tsg%5Fran/WG1%5FRL1/TSGR1%5F91/Docs/ [retrieved on Nov. 18, 2017], Section 2.

(Continued)

*Primary Examiner* — Awet Haile
(74) *Attorney, Agent, or Firm* — Liem T. Do

(57) ABSTRACT

Wireless communications systems and methods related to communicating in a frequency band based on bandwidth parts are provided. A first wireless communication device communicates with a second wireless communication device, a first configuration indicating a plurality of bandwidth parts in a frequency band, the plurality of bandwidth parts based on an expected channel access pattern associated with a listen-before-talk (LBT) in the frequency band. The first wireless communication device communicates, with the second wireless communication device, a first communication signal in a first bandwidth part of the plurality of bandwidth parts based on an LBT result.

42 Claims, 14 Drawing Sheets

(56) References Cited

U.S. PATENT DOCUMENTS

| | | | | |
|---|---|---|---|---|
| 2018/0352537 | A1* | 12/2018 | Zhang | H04W 72/1268 |
| 2018/0368145 | A1* | 12/2018 | Abdoli | H04W 72/0453 |
| 2019/0253200 | A1* | 8/2019 | Salem | H04W 72/042 |
| 2019/0372714 | A1* | 12/2019 | Jiao | H04L 1/0071 |
| 2020/0059961 | A1* | 2/2020 | Do | H04W 72/02 |
| 2020/0120545 | A1* | 4/2020 | Li | H04W 72/044 |
| 2020/0274750 | A1* | 8/2020 | Yi | H04L 27/2613 |
| 2020/0374848 | A1* | 11/2020 | Zhang | H04L 5/0053 |

OTHER PUBLICATIONS

International Search Report and Written Opinion—PCT/US2019/020026—ISA/EPO—dated Apr. 26, 2019.

NEC: "Frequency Hopping Schemes for NR UL PUSCH", 3GPP Draft, R1-1720900 Frequency Hopping Schemes for NR UL PUSCH V1D, 3rd Generation Partnership Project (3GPP), Mobile Competence Centre, 650, Route Des Lucioles, F-06921 Sophia-Antipolis Cedex, vol. RAN WG1, No. Reno, Nevada, US, Nov. 27, 2017-Dec. 1, 2017, Nov. 18, 2017 (Nov. 18, 2017), XP051370290, 5 Pages, Retrieved from the Internet: URL:http://www.3gpp.org/ftp/tsg%5Fran/WG1%5FRL1/TSGR1%5F91/Docs/ [retrieved on Nov. 18, 2017], Section 3.

Qualcomm Incorporated: "Waveform Options Under PSD limitation", 3GPP Draft, R1-1802869 7.6.5 Waveformunderpsdsub6, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018 (Feb. 17, 2018), XP051398282, 12 Pages, Retrieved from the Internet:URL:http://www.3gpp.org/ftp/tsg%5Fran/WG1%5FRL1/TSGR1%5F92/Docs/ [retrieved on Feb. 17, 2018], Sections 3 and 4.

VIVO: "Potential Solutions and Techniques for NR Unlicensed Spectrum", 3GPP Draft, R1-1801557, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 15, 2018 (Feb. 15, 2018), XP051396809, 6 Pages, Retrieved from the Internet: URL:http://www.3gpp.org/ftp/tsg%5Fran/WG1%5FRL1/TSGR1%5F92/Docs/ [retrieved on Feb. 15, 2018], Section 3.2.

Qualcomm Incorporated: "On UL Resource Allocation for 10MHz eLAA", R1-1609944, 3GPP TSG RAN WG1 #86bis, Oct. 10-14, 2016, Lisbon, Portugal, pp. 1-2.

European Search Report—EP21216583—Search Authority—The Hague—dated Mar. 16, 2022.

* cited by examiner

BANDWIDTH PART (BWP) CONFIGURATION FOR SUBBAND ACCESS IN NEW RADIO-UNLICENSED (NR-U)

CROSS REFERENCE TO RELATED APPLICATIONS

The present application claims priority to and the benefit of India Patent Application No. 201841007756, filed Mar. 1, 2018, which is hereby incorporated by reference in its entirety as if fully set forth below and for all applicable purposes.

TECHNICAL FIELD

This application relates to wireless communication systems, and more particularly to configuring bandwidth parts (BWPs) in a frequency spectrum shared by multiple network operating entities and communicating in the frequency spectrum based on the configured BWPs.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR may operate over a wider bandwidth (BW) at higher frequencies than LTE. In addition, NR introduces the concept of BWPs, where a BS may dynamically configure a UE to communicate over a portion of a network system BW instead of over the entire network system BW. The use of BWPs can provide several benefits, such as reducing UE BW capability requirements, reducing power consumptions at UEs, reducing signaling overheads, and/or allowing for load balancing within a component carrier (CC), despite the wider network system BW. Further, NR may operate across different spectrum types, from licensed spectrum to unlicensed and shared spectrum. Spectrum sharing enables operators to opportunistically aggregate spectrums to dynamically support high-BW services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. A transmitting node may listen to one or more channels (e.g., frequency subbands) within the frequency spectrum. Depending on the LBT result, the transmitting node may access one or more channels. In some instances, the transmitting node may listen to different channels depending on whether the LBT is for an uplink (UL) channel access or for a downlink (DL) channel access. The different channel access BWs may require different guard bands for interference protection against transmissions in adjacent channels, for example, by nodes of a different network operating entity. NR over a licensed spectrum may have such channel access requirements. As such, the NR BWP configuration model may not be directly applied for use in a shared or unlicensed spectrum.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication including communicating, by a first wireless communication device with a second wireless communication device, a first configuration indicating a plurality of bandwidth parts in a frequency band, the plurality of bandwidth parts based on an expected channel access pattern associated with a listen-before-talk (LBT) in the frequency band; and communicating, by the first wireless communication device with the second wireless communication device, a first communication signal in a first bandwidth part of the plurality of bandwidth parts based on an LBT result.

In an additional aspect of the disclosure, a method of wireless communication includes communicating, by a first wireless communication device with a second wireless communication device, a first configuration indicating a plurality of bandwidth parts in a frequency band, the frequency band including at least a first set of resource blocks interlaced with a second set of resource blocks; and communicating, by the first wireless communication device with the second wireless communication device, a first communication signal using at least a portion of the first set of resource blocks within a first bandwidth part of the plurality of bandwidth parts based on a first listen-before-talk (LBT) result.

In an additional aspect of the disclosure, an apparatus including a transceiver configured to communicate, with a second wireless communication device, a first configuration indicating a plurality of bandwidth parts in a frequency band, the plurality of bandwidth parts based on an expected channel access pattern associated with a listen-before-talk (LBT) in the frequency band; and communicate, with the second wireless communication device, a first communication signal in a first bandwidth part of the plurality of bandwidth parts based on an LBT result.

In an additional aspect of the disclosure, an apparatus including a transceiver configured to communicate, with a first wireless communication device, a first configuration indicating a plurality of bandwidth parts in a frequency band, the frequency band including at least a first set of resource blocks interlaced with a second set of resource blocks; and communicate, with the first wireless communication device, a first communication signal using at least a portion of the first set of resource blocks within a first bandwidth part of the plurality of bandwidth parts based on a first listen-before-talk (LBT) result.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
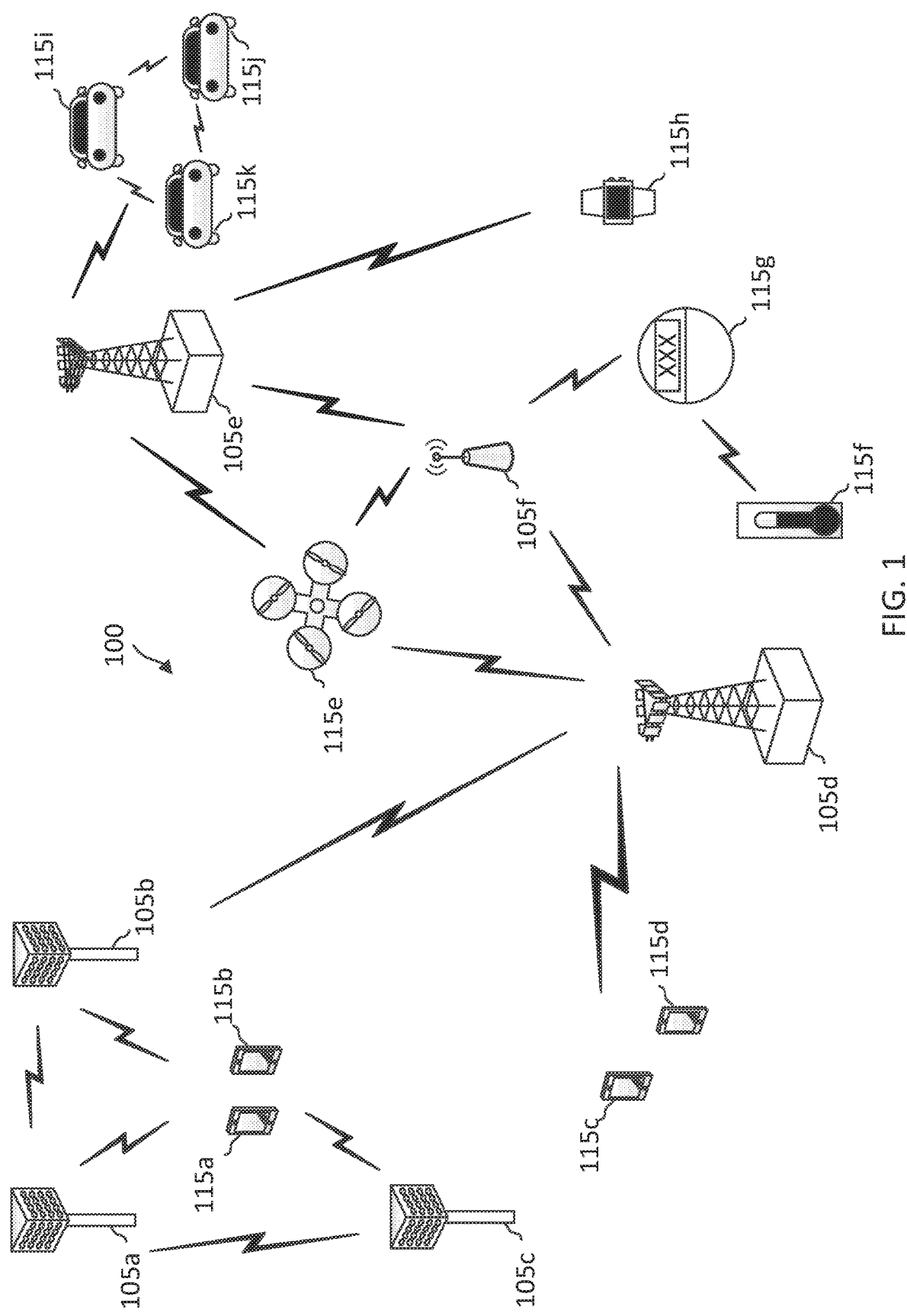
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for configuring bandwidth parts (BWPs) in a frequency spectrum shared by multiple network operating entities and communicating in the frequency spectrum based on the configured BWPs. For example, a BS may partition a shared frequency band or an unlicensed frequency band into a plurality of channels. Channel access in the frequency band may be in units of channels. The BS may configure a plurality of BWPs including one or more channels based on an expected channel access pattern associated with a listen-before-talk (LBT) procedure in the frequency band. For example, a BS or a UE may perform an LBT in the frequency band and may access one or more of the channels based on the result of the LBT.

In an embodiment, the BS may provide a flexible BWP configuration including any combination of channels in the frequency band. For example, a BWP may include one or more contiguous channels or one or more non-contiguous channels. The BS may transmit a configuration indicating the BWPs. The BS may configure a UE with one active BWP at a given time. The BS may schedule communications with the UE within the active BWP.

In an embodiment, the BS may select a primary channel from among the channels in the frequency band. Each BWP may include at least the primary channel and may additionally include one or more of the other channels. The BS or the UE may perform a listen-before-talk (LBT) procedure in the primary channel and may determine whether to transmit in the active BWP based on the whether the primary channel is clear or busy.

In an embodiment, the BS may allocate resources in units of frequency interlace. For example, the BS may partition the frequency band into resource blocks, which may be referred to as physical resource blocks (PRBs). Each channel may include a group of contiguous resource blocks. The BS may configure a plurality of frequency interlaces in the frequency band. Each frequency interlace may include a set of resource blocks spaced apart from each other and frequency interlacing with a set of resource blocks of another frequency interlace. The BS may configure the frequency interlaces such that frequency interlaces for different BWPs are consistent and compatible with each other. The BS may configure the PRBs, BWPs, and frequency interlaces with respect to a common starting frequency (e.g., a common reference PRB). The BS may allocate a certain frequency interlace to a UE for communication. The BS may communicate with the UE using resource blocks of the allocated frequency interlace within the active BWP of the UE. When the communication is in an unlicensed frequency band with a power spectral density (PSD) limitation, the interlaced waveform-based transmission can allow for maximization of transmit power utilization.

In an embodiment, the BS may select a common reference resource block or a starting frequency location for the plurality of resource blocks. The selection may be dependent on guard band requirements for each BWP and/or center frequencies of the channels. The selection may maximize a function associated with a number of usable resource blocks in each BWP. A usable resource block refers to a resource block that does not include any portion of a guard band.

In some embodiments, the BS may configure a BWP for uplink (UL) independent of a BWP for downlink (DL). For example, the BS may allow the UL BWP and the DL BWP to have the same center frequency or different center frequencies. In addition, the BW may allow the UL BWP and the DL BWP to have the same BW or different BWs. While the disclosed embodiments are described in the context of NR-unlicensed (NR-U), the disclosed embodiments are suitable for use with any wireless communication networks that operate over a shared frequency band or an unlicensed frequency band.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105$d$ and 105$e$ may be regular macro BSs, while the BSs 105$a$-105$c$ may be macro BSs enabled with one of 3 dimension (3D), full dimension (FD), or massive MIMO. The BSs 105$a$-105$c$ may take advantage of their higher dimension MIMO capabilities to exploit 3D beamforming in both elevation and azimuth beamforming to increase coverage and capacity. The BS 105$f$ may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115$a$-115$d$ are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115$e$-115$k$ are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105$a$-105$c$ may serve the UEs 115$a$ and 115$b$ using 3D beamforming and coordinated spatial techniques, such as coordinated multipoint (CoMP) or multi-connectivity. The macro BS 105$d$ may perform backhaul communications with the BSs 105$a$-105$c$, as well as small cell, the BS 105$f$. The macro BS 105$d$ may also transmits multicast services which are subscribed to and received by the UEs 115$c$ and 115$d$. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115$e$, which may be a drone. Redundant communication links with the UE 115$e$ may include links from the macro BSs 105$d$ and 105$e$, as well as links from the small cell BS 105$f$. Other machine type devices, such as the UE 115$f$ (e.g., a thermometer), the UE 115$g$ (e.g., smart meter), and UE 115$h$ (e.g., wearable device) may communicate through the network 100 either directly with BSs, such as the small cell BS 105$f$, and the macro BS 105$e$, or in multi-hop configurations by communicating with another user device which relays its information to the network, such as the UE 115$f$ communicating temperature measurement information to the smart meter, the UE 115$g$, which is then reported to the network through the small cell BS 105$f$. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs)

and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication tha UL communication. A UL-centric subframe may include a longer duration for UL communication tha UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, the MIB, the RMSI, and/or the OSI in the form of synchronization signal blocks (SSBs).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI and/or OSI. The RMSI and/or OSI may include radio resource configuration (RRC) configuration information related to random access channel (RACH) procedures, paging, physical uplink control channel (PUCCH), physical uplink shared channel (PUSCH), power control, SRS, and cell barring. After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In an embodiment, the network 100 may operate over a shared frequency band or an unlicensed frequency band, for example, at about 3.5 gigahertz (GHz), sub-6 GHz or higher frequencies. For example, the BSs 105 and the UEs 115 may be operated by multiple network operating entities sharing resources in the shared communication medium and may employ a listen-before-talk (LBT) procedure to reserve transmission opportunities (TXOPs) in the share medium for communications. The network 100 may partition the frequency band into multiple channels, for example, each occupying about 20 megahertz (MHz). A BS 105 may configure a plurality of BWPs, each including one or more of the channels for communications with UEs 115 in the network 100. The BS 105 may configure one of the BWPs as an active BWP for a UE 115. For example, the BS 105 or the UE 115 may perform an LBT on multiple channels in the frequency band prior to transmitting in the frequency band and may transmit in one or more channels based on the LBT result. The BS 105 may assign an active BWP to the UE 115 based on the one or more channels with channel access.

In some embodiments, a BS 105 may assign one of the channels as a primary channel for LBT purpose and may configure BWPs based on the primary channel. In some embodiments, a BS 105 may configure frequency interlaces in the frequency band and may schedule resources in units of frequency interlaces. In some embodiments, a BS 105 may determine guard bands for different BWPs and may configure PRBs in the frequency band for channel-mapping or BWP-mapping by considering the number of usable PRBs for allocations in each BWP. Mechanisms for configuring BWPs, frequency interlaces, PRBs, and/or guard bands for communications in a shared frequency band or unlicensed frequency bands are described in greater detail herein.

Figure 2:
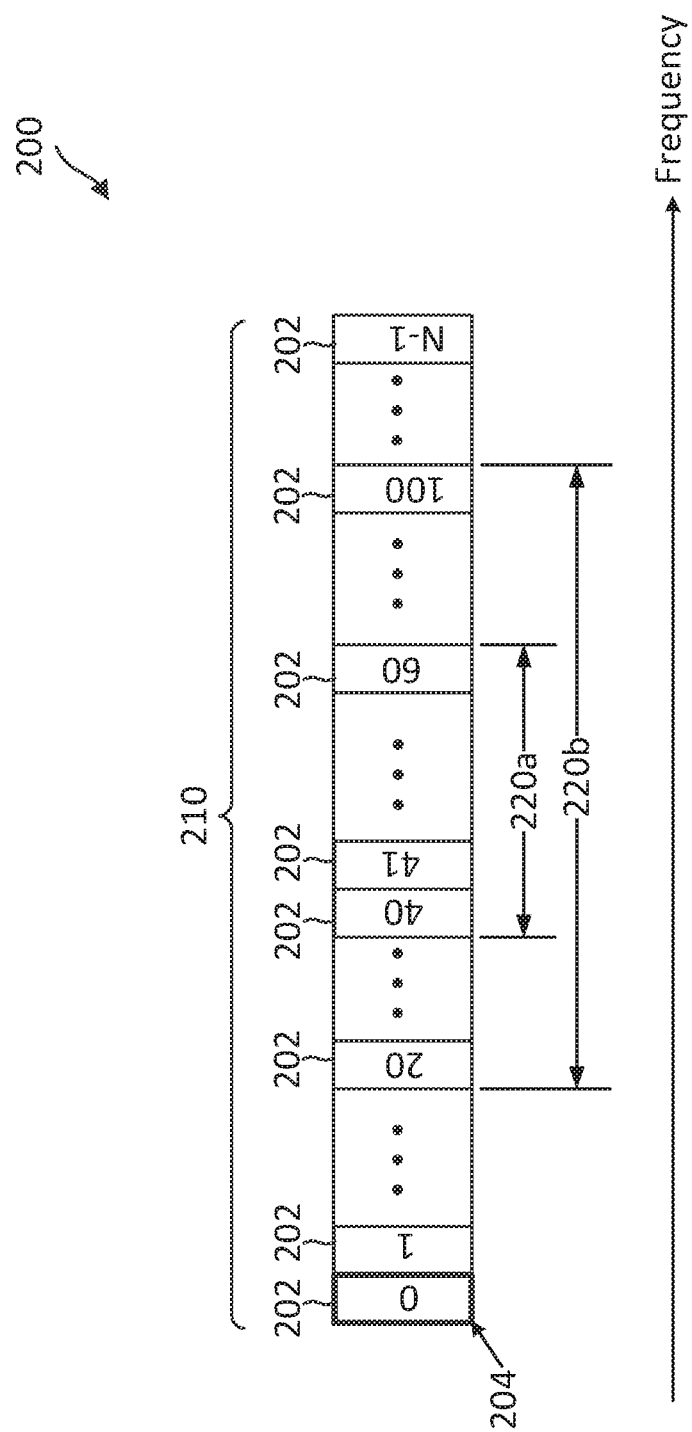
FIG. 2 illustrates a bandwidth part (BWP) configuration according to some embodiments of the present disclosure.

FIG. 2 illustrates a BWP configuration 200 according to some embodiments of the present disclosure. The configuration 200 may be employed by BSs such as the BSs 105 and UEs such as the UEs 115 in a network such as the network 100. In FIG. 2, the x-axis represents frequency in some constant units. The configuration 200 shows a frequency band 210 including a plurality of PRBs 202. The frequency band 210 may be located at any suitable frequencies, for example, at about 3.5 GHz, sub-6 GHz, or in the mmWave bands. The frequency band 210 may correspond to a system BW or component carrier BW in a network. In an embodiment, the frequency band 210 may be a licensed band used by an NR network. Each PRB 202 may include a plurality subcarriers or frequency tones. In some embodiments, each PRB 202 may include about twelve subcarriers. The frequency band 210 may be partitioned into a plurality of BWPs 220. The plurality of BWPs 220 may or may not be overlapping. For simplicity of illustration and discussion, FIG. 2 illustrates two BWPs 220a and 220b, though it will be recognized that embodiments of the present disclosure may scale to include any suitable number of BWPs 220 (e.g., about 3, 4, or more). Each BWP 220 may include a group of contiguous PRBs 202 and may be associated with a particular numerology (e.g., subcarrier spacing, cyclic prefix (CP) type) for communications in the BWP 220.

In some embodiment, a serving cell may include a maximum of about four UL BWPs 220 and about four DL BWPs 220. In some embodiments, a serving cell may include a maximum of about four pairs of UL/DL BWPs 220 for paired spectrum (e.g., for TDD operations). In other words, a DL BWP 220 and a UL BWP 220 are jointly configured to form a pair of UL/DL BWPs 220. In an embodiment, a DL/UL BWP pair may include the same center frequency, but may include different UL and DL BWs.

At any given time, one DL BWP 220 and/or one UL BWP 220 may be active. The UE are not required to monitor or receive a physical downlink shared channel (PDSCH) signal (e.g., carrying DL data), a physical downlink control channel (PDCCH) signal (e.g., carrying DL control information, UL scheduling grants, and/or DL scheduling grants), a channel state information-reference signal (CSI-RS), or a tracking reference signal (TRS) outside an active DL BWP 220. The UE may not transmit a PUSCH signal or a PUCCH signal outside an active UL BWP 220.

In an embodiment, the configuration 200 may use a common indexing scheme for the PRBs 202. For example, the PRBs 202 may be configured based on a common reference PRB 204, which may be referred to as PRB0. Each BWP 220 may include a group of contiguous PRBs 202 with respect to the common reference PRB 204. As shown, the PRBs 202 are indexed from 0 to N−1 starting from the common reference PRB 204, where N is a positive integer. The value N may be dependent on the BW of the frequency band 210 and the SCS or BW of the PRBs 202. As an example, one UE may be configured with a BWP 220a from PRB 202 indexed 40 to PRB 202 indexed 60, while another UE may be configured with a BWP 220b from PRB 202 indexed 20 to PRB 202 indexed 100.

In an embodiment, a UE may receive RRC signaling from a BS regarding information associated with the common reference PRB 204 (e.g., PRB0). For example, the RRC signaling may indicate an offset between a reference location and a lowest-frequency subcarrier of the common reference PRB 204. For example, the reference location may be defined based on the lowest-frequency subcarrier in which a cell-defining SSB is transmitted or indicated in RMSI, cell configurations, UL configurations depending on whether the set of PRBs 202 is in a primary cell or a secondary cell or whether the set of PRBs 202 is for UL access or DL access. The common reference PRB 204 can be defined based on a 15 kHz SCS in a certain frequency range or a 30 kHz SCS in another frequency range. The offset may be indicated in units of PRBs 202.

Figure 3:
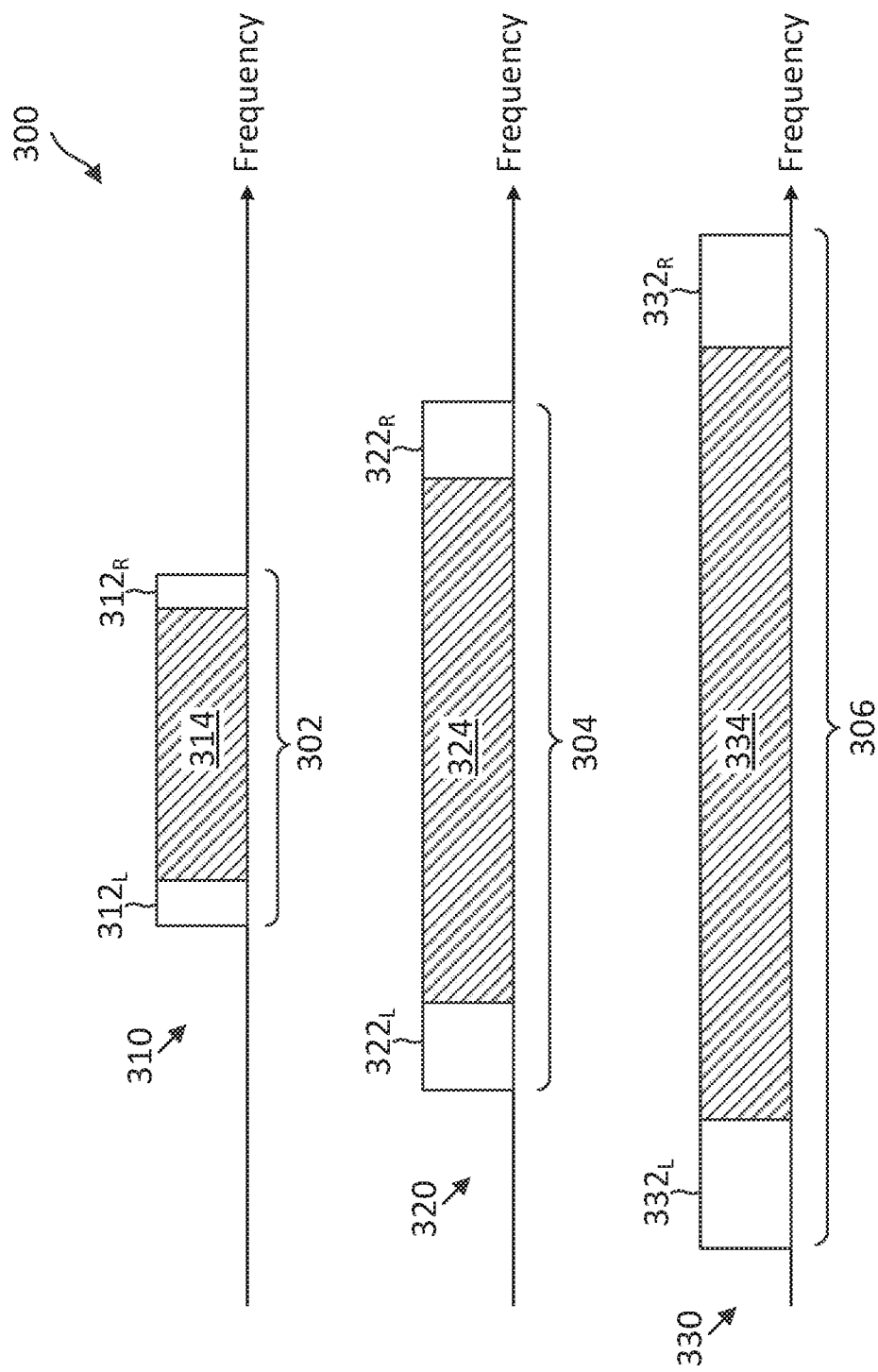
FIG. 3 illustrates a guard band configuration according to some embodiments of the present disclosure.

FIG. 3 illustrates a guard band configuration 300 according to some embodiments of the present disclosure. The configuration 300 may be employed by BSs such as the BSs 105 and UEs such as the UEs 115 in a network such as the network 100. In FIG. 3, the x-axis represents frequency in some constant units. The configuration 300 illustrates guard band configurations for channel access scenarios 310, 320, and 330 with different BWs 302, 304, and 306, respectively. Guard bands are included at edges of a channel BW to mitigate interference from simultaneous transmissions in adjacent channels. The frequency band 210 may have a channel BW corresponding to the BW 302, 304, or 306.

In the scenario 310, a channel access may be over a BW 302 of about 20 MHz, for example, including about 256 resource elements (REs) (e.g., subcarriers with SCS of about 78.125 kHz). The configuration 300 may configure a guard band $312_L$ including about six REs at the left edge of the BW 302 and a guard band 312R including about five REs at the right edge of the BW 302. A communication signal 314 may be transmitted in a usable portion of the BW 302 excluding the guard bands 312 as shown by the pattern-filled box.

In the scenario 320, a channel access may be over a BW 304 of about 40 MHz, for example, including about 512 REs. The configuration 300 may configure a guard band $322_L$ including about twelve REs at the left edge of the BW 304 and a guard band $322_R$ including about eleven REs at the right edge of the BW 304. A communication signal 324 may be transmitted in a usable portion of the BW 304 excluding the guard bands 322 as shown by the pattern-filled box.

In the scenario 330, a channel access may be over a BW 306 of about 80 MHz, for example, including about 1024 REs. The configuration 300 may configure a guard band $332_L$ including about twelve REs at the left edge of the BW 304 and a guard band $332_R$ including about eleven REs at the right edge of the BW 306. A communication signal 334 may be transmitted in a usable portion of the BW 306 excluding the guard bands 332 as shown by the pattern-filled box.

As can be seen, different channel access BWs may require different guard band BWs. In addition, the left guard band and the right guard band for a channel may be configured with different BWs. As describe above, channel accesses in a shared frequency band or an unlicensed frequency band may have different BWs depending on LBT results. Thus, BWPs (e.g., the BWPs 220) with different BWs may require different guard band BWs. Mechanisms for configuring guard bands with BWPs in a shared frequency band or an unlicensed frequency band are described in greater detail herein.

Figure 4:
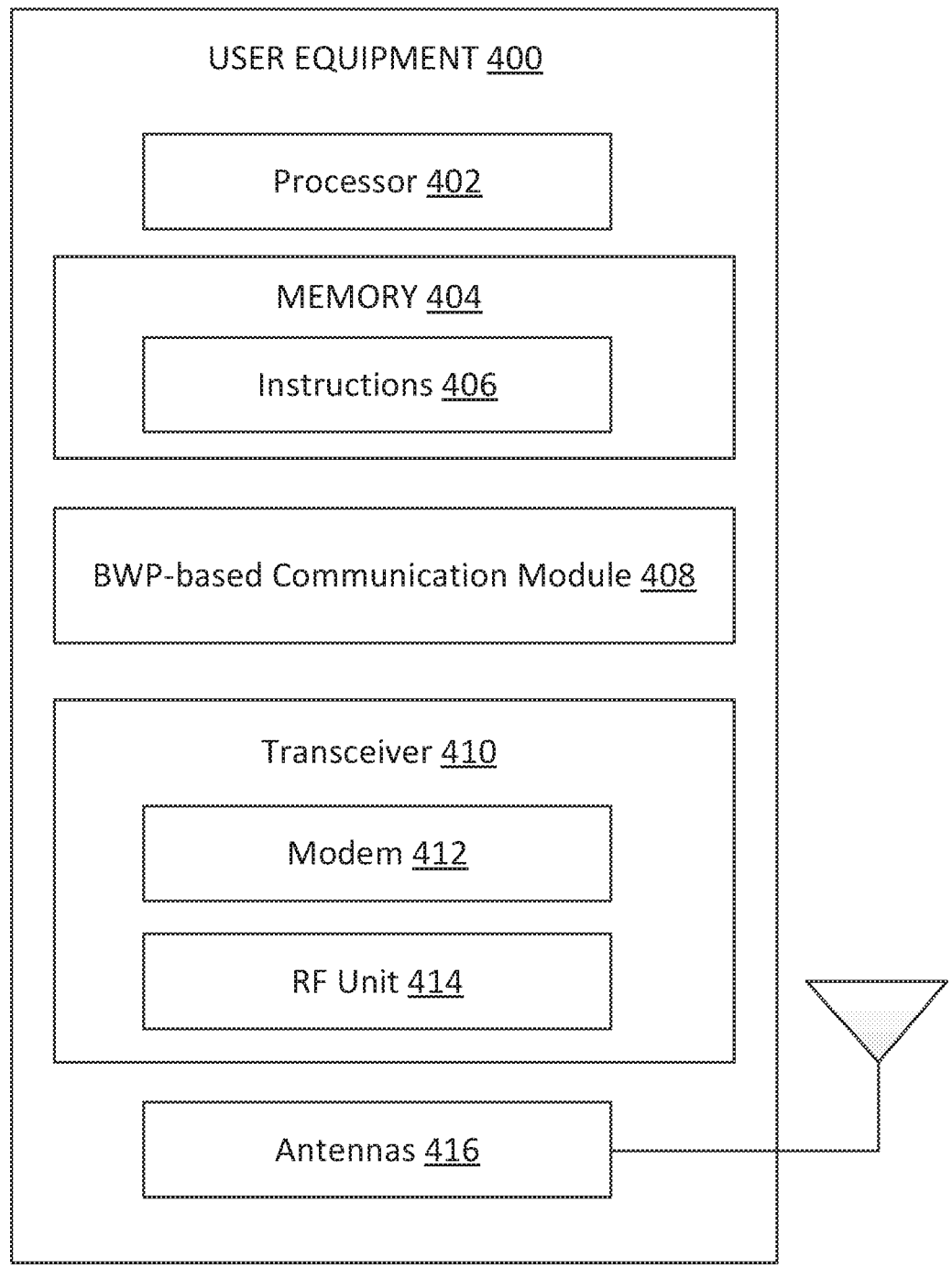
FIG. 4 is a block diagram of an exemplary user equipment (UE) according to embodiments of the present disclosure.

FIG. 4 is a block diagram of an exemplary UE 400 according to embodiments of the present disclosure. The UE 400 may be a UE 115 as discussed above. As shown, the UE 400 may include a processor 402, a memory 404, a BWP-based communication module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 115 in connection with embodiments of the present disclosure, for example, aspects of FIGS. 6-14. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The BWP-based communication module 408 may be implemented via hardware, software, or combinations thereof. For example, the BWP-based communication module 408 may be implemented as a processor, circuit, and/or instructions 406 stored in the memory 404 and executed by the processor 402. The BWP-based communication module 408 may be used for various aspects of the present disclosure, for example, aspects of FIGS. 6-14. For example, the BWP-based communication module 408 is configured to receive a BWP configuration from a BS (e.g., the BSs 105), perform LBTs based on a primary channel within an active BWP, receive scheduling grants from the BS, and/or communicate with the BS in the active BWP based on the scheduling grants. In some embodiments, a scheduling grant can indicate a frequency interlace. In such embodiments, the BWP-based communication module 408 is configured to communicate with the BS using a portion of the allocated frequency interlace within the active BWP. Mechanisms for communicating with a BS based on BWPs are described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, and/or the BWP-based communication module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

Figure 5:
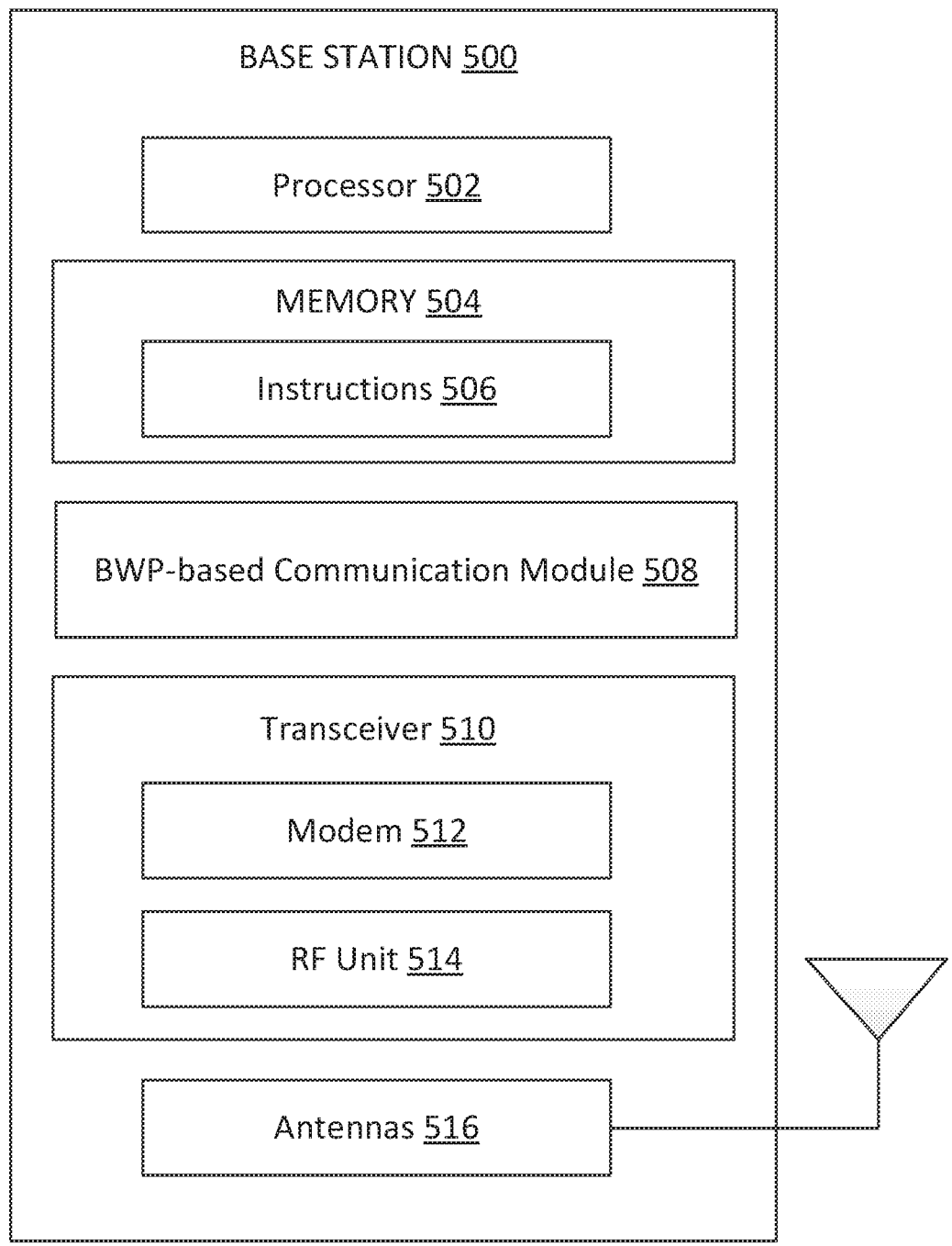
FIG. 5 is a block diagram of an exemplary base station (BS) according to embodiments of the present disclosure.

FIG. 5 is a block diagram of an exemplary BS 500 according to embodiments of the present disclosure. The BS 500 may be a BS 105 as discussed above. A shown, the BS 500 may include a processor 502, a memory 504, a BWP-based communication module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 6-14. Instructions 506 may also be referred to as code, which may be interpreted broadly to include any type of computer-readable statement(s) as discussed above with respect to FIG. 4.

The BWP-based communication module 508 may be implemented via hardware, software, or combinations thereof. For example, BWP-based communication module 508 may be implemented as a processor, circuit, and/or instructions 506 stored in the memory 504 and executed by the processor 502. The BWP-based communication module 508 may be used for various aspects of the present disclosure, for example, aspects of FIGS. 6-14. For example, the BWP-based communication module 508 is configured to configure BWPs in a frequency band based on a primary channel in the frequency band, transmit the BWP configurations to a UE (e.g., the UEs 115 and 400), perform LBT in the frequency band based on the primary channel, assign an active BWP to a UE, and/or communicate with the UE in an active BWP. The BWP-based communication module 508 can be further configured to determine guard bands for the BWPs based on BWs of the BWPs, determine a common reference PRB for a PRB grid for mapping the BWPs onto the PRB grid, configure frequency interlaces based on the PRB grid, allocate frequency interlaces to UEs, and/or communicate with UEs based on an active BWP and allocated frequency interlaces. Mechanisms for communicating with UEs based on BWPs are described in greater detail herein.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or 400. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices and provide the received data messages for processing and/or demodulation at the transceiver 510. The antennas 516 may include multiple antennas of similar or different designs in order to sustain multiple transmission links.

Figure 6:
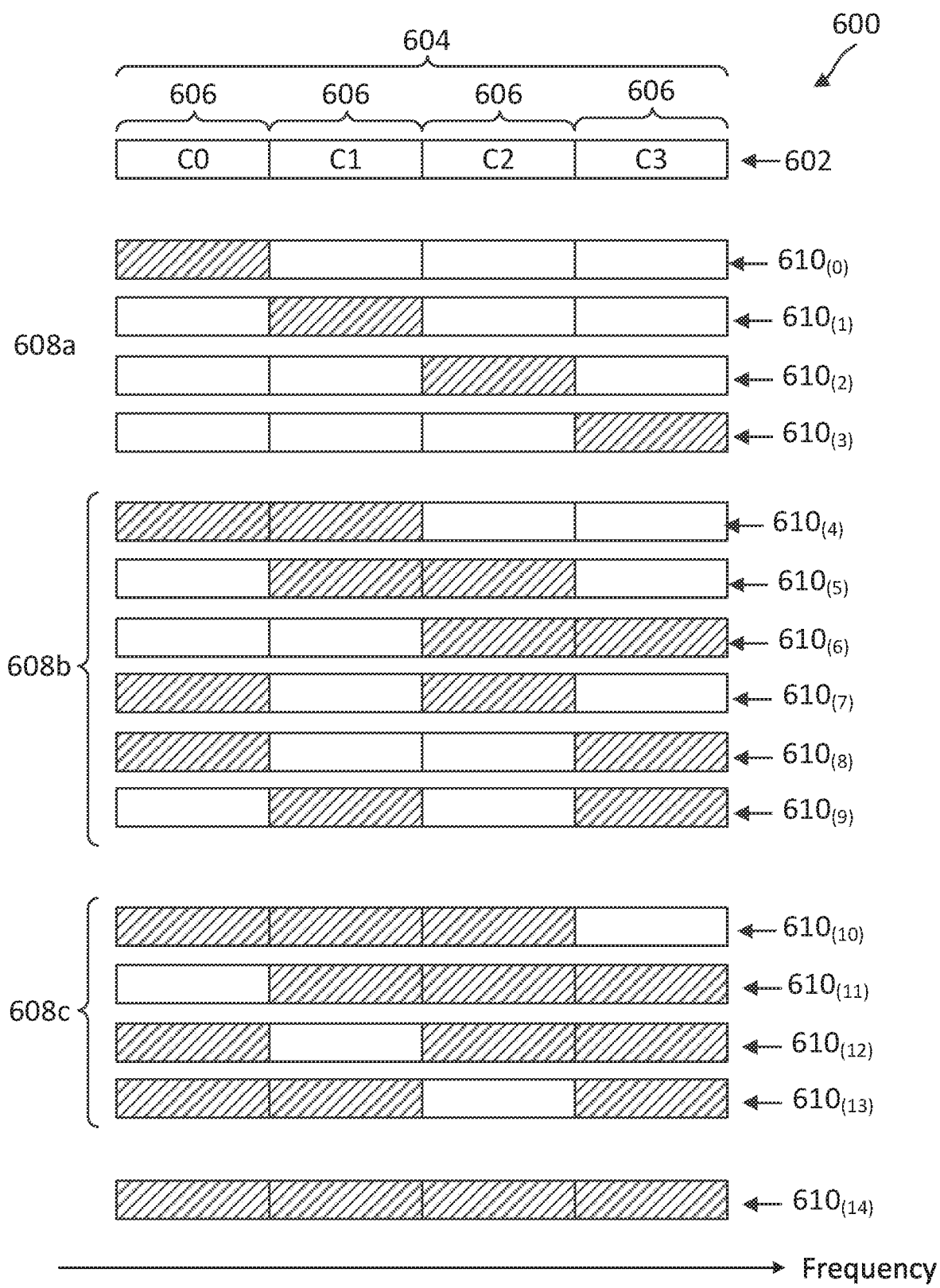
FIG. 6 illustrates a BWP configuration scheme according to some embodiments of the present disclosure.

FIG. 6 illustrates a BWP configuration scheme 600 according to some embodiments of the present disclosure. The scheme 600 may be employed by the network 100. In particular, a BS 105 may employ the scheme 600 to configure BWPs in a shared frequency band or an unlicensed frequency band 604. In FIG. 6, the x-axis represents frequency in some constant units. The scheme 600 partitions the frequency band 604 into a plurality of channels 606 as shown in the channel configuration 602. Each channel 606 may include a plurality of PRBs (e.g., the PRBs 202). The frequency band 604 and the channels 606 may have any suitable BWs. As an example, the frequency band 604 may have a BW of about 80 MHz and may be partitioned into about four channels 606, where each channel 606 may have a BW of about 20 MHz. The channels 606 are shown as C0, C1, C2, and C3.

The scheme 600 allows for a flexible BWP configuration, where a channel access may be over one, two, three, or all four channels 606. In addition, the scheme 600 may allow for channel access over non-contiguous channels 606. In other words, the scheme 600 may not restrict a BWP 610 to include contiguous PRBs 202 as in the configuration 200. Thus, the scheme 600 may configure up to about 15 different BWPs 610 with the four channels 606.

The scheme 600 may configure a BWP including a group 608a of BWPs 610, each including one channel 606 shown by the pattern-filled boxes. For example, the BWP $610_{(0)}$ includes the channel C0 606, the BWP $610_{(1)}$ includes the channel C1 606, the BWP $610_{(2)}$ includes the channel C2 606, and the BWP $610_{(3)}$ includes the channel C3 606.

The scheme 600 may further configure a group 608b of BWPs 610, each including two channels 606 shown by the pattern-filled boxes. For example, the BWP $610_{(4)}$ includes the channels C0 and C1 606, the BWP $610_{(5)}$ includes the channels C1 and C2 606, the BWP $610_{(6)}$ includes the channels C2 and C3 606, the BWP $610_{(7)}$ includes the channels C0 and C2 606, the BWP $610_{(8)}$ includes the channels C0 and C3 606, and the BWP $610_{(9)}$ includes the channels C1 and C3 606.

The scheme 600 may configure a group 608c of BWPs 610, each including three channels 606 shown by the pattern-filled boxes. For example, the BWP $610_{(10)}$ includes the channels C0, C1, and C2 606, the BWP $610_{(11)}$ includes the channels C1, C2, and C3 606, the BWP $610_{(12)}$ includes the channels C0, C2, and C3 606, and the BWP $610_{(13)}$ includes the channels C0, C1, and C3 606. The scheme 600 may further configure a BWP $610_{(14)}$ including all four channels 606 shown by the pattern-filled boxes.

A BS may configure a UE with any of the BWPs 610. The BS may communicate with the UE in a corresponding BWP 610 after performing an LBT in channels 606 within the corresponding BWP 610. The BS may assign different BWPs 610 to different UEs. The BS may assign overlapping BWPs 610 to different UEs. For example, the BS may assign the BWP $610_{(3)}$ including the channel C3 606 to one UE and assign the BWP $610_{(6)}$ including the channels C2 and C3 606 to another UE. In addition, a BS may configure DL and UL BWP pairs with different center frequencies. For example, a BS may configure a DL BWP $610_{(4)}$ (e.g., including channels C0 and C1 606) paired with a UL BWP $610_{(9)}$ (e.g., including channels C1 and C3 606) for communication with a UE. Similar to the configuration 200, a UE may be configured with one active BWP or an active UL/DL BWP pair at a given time and may not be required to monitor signals outside the active DL BWP or transmit signals outside the active UL BWP.

FIGS. 7-10 illustrate various mechanisms for configuring a shared frequency band or an unlicensed frequency band (e.g., the frequency band) with a maximum of about four BWPs based on a primary channel in which LBT is performed to gain channel access. In FIGS. 7-10, the x-axes represent frequency in some constant units.

Figure 7:
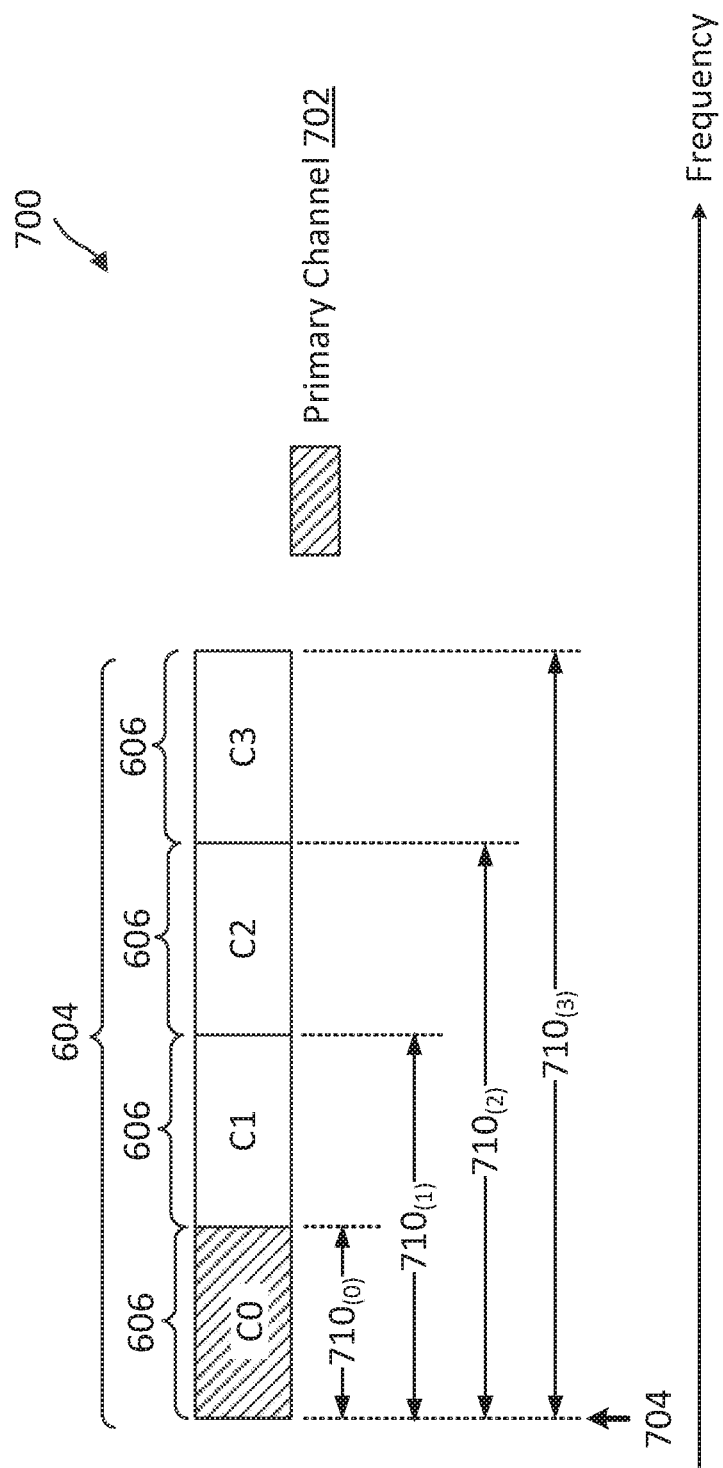
FIG. 7 illustrates a BWP configuration scheme according to some embodiments of the present disclosure.

FIG. 7 illustrates a BWP configuration scheme 700 according to some embodiments of the present disclosure. The scheme 700 can be employed by a BS such as the BS 105. The scheme 700 is illustrated using the same channel structure as in the channel configuration 602 of the scheme 600. The scheme 700 may select one of the channels 606 as a primary channel 702. For example, the scheme 700 may select the channel C0 606 as the primary channel 702 as shown by the pattern-filled box. The scheme 700 may configure BWPs 710 based on the primary channel 702 such that each BWP 710 may include the primary channel 702. A channel access in any of the BWP 710 may be dependent on an LBT result (e.g., a busy channel status or a clear channels status) in the primary channel 702, as described in greater detail herein.

The scheme 700 may configure a maximum of about four BWPs 710 in the frequency band 604, each including one or more contiguous channels 606 including the primary channel 702. For example, the BWP $710_{(0)}$ includes the channel C0 606 corresponding to the primary channel 702. The BWP $710_{(1)}$ includes the channels C0 606 corresponding to the primary channel 702 and the channel C1 606. The BWP $710_{(2)}$ includes the channels C0 606 corresponding to the primary channel 702 and the channels C1 and C2 606. The BWP $710_{(3)}$ includes all channels 606 including the primary channel 702 (e.g., the channel C0 606).

A BS may configure a UE with any of the BWPs 710. A BS or a UE may monitor the channel status of the primary channel 702 for channel access irrespective of which BWP 710 is intended for the channel access. Similar to the configuration 200, a BS may configure a UE with one active BWP or one active UL/DL BWP pair at a given time and the UE may not be required to monitor any signal outside the DL active BWP or transmit any signal outside the active UL BWP.

In an embodiment, a BS may configure a UE with the BWP $710_{(1)}$ including the channels C0 and C1 606 for UL or DL communications. The BS may schedule resources within the BWP $710_{(1)}$ for communications with the UE. The BS may perform an LBT in the primary channel 702 before transmitting a DL signal to the UE. For example, the BS may listen for a reservation signal (e.g., including a predetermined preamble signal) in the primary channel 702 to gain access to a TXOP in the BWP $710_{(1)}$. When the primary channel 702 is clear, the BS may transmit a reservation signal in the primary channel 702 to reserve the TXOP so that other nodes may refrain from accessing the frequency band 604 during the reserved TXOP. Subsequently, the BS may transmit a DL signal to the UE in the BWP $710_{(1)}$. It should be noted that as long as the BS detects an active transmission in the primary channel 702, the BS may refrain from accessing the BWP $710_{(1)}$ irrespective of whether the channel C1 606 is busy or idle.

In an embodiment, a BS may configure a UL/DL BWP pair for a UE. For example, the UL/DL BWP pair may include the BWP $710_{(1)}$ (e.g., including the channels C0 and C1 606) for DL and the BWP $710_{(0)}$ (e.g., including the channel C0 606) for UL. Alternatively, the UL/DL BWP pair may include the BWP $710_{(1)}$ (e.g., including the channels C0 and C1 606) for DL and the BWP $710_{(0)}$ (e.g., including the channel C0 606) for UL. Yet alternatively, the UL/DL BWP pair may include the BWP $710_{(1)}$ (e.g., including the channels C0 and C1 606) for DL and the same BWP $710_{(1)}$ for UL.

As described above with respect to FIG. 1, a BS may broadcast system information associated with a network in the form of SSBs. The BWP in which a BS transmits the SSBs may be referred to as the initial active DL BWP. The initial active DL BWP may be configured with a control resource set (CORESET) for RMSI communications. When an initial active DL BWP falls within a primary channel (e.g., the primary channel 702), the scheme 700 may configure up to about three additional BWPs 710 in the frequency band 604. For example, the scheme 700 may configure a first BWP including the initial active DL BWP and three additional BWPs 710, which may include the BWPs $710_{(0)}$, $710_{(1)}$, and $710_{(3)}$. When the SSBs do not fall within a primary channel, the scheme 700 may configure up to about four BWPs 710. Similar to the configuration 200, the set of channels 606 may start at a certain frequency location, for example, a reference starting subcarrier 704 for a lowest-frequency PRB (e.g., the common reference PRB 204). Mechanisms for determining a common reference PRB for mapping the channels 606 are described in greater detail herein.

Figure 8:
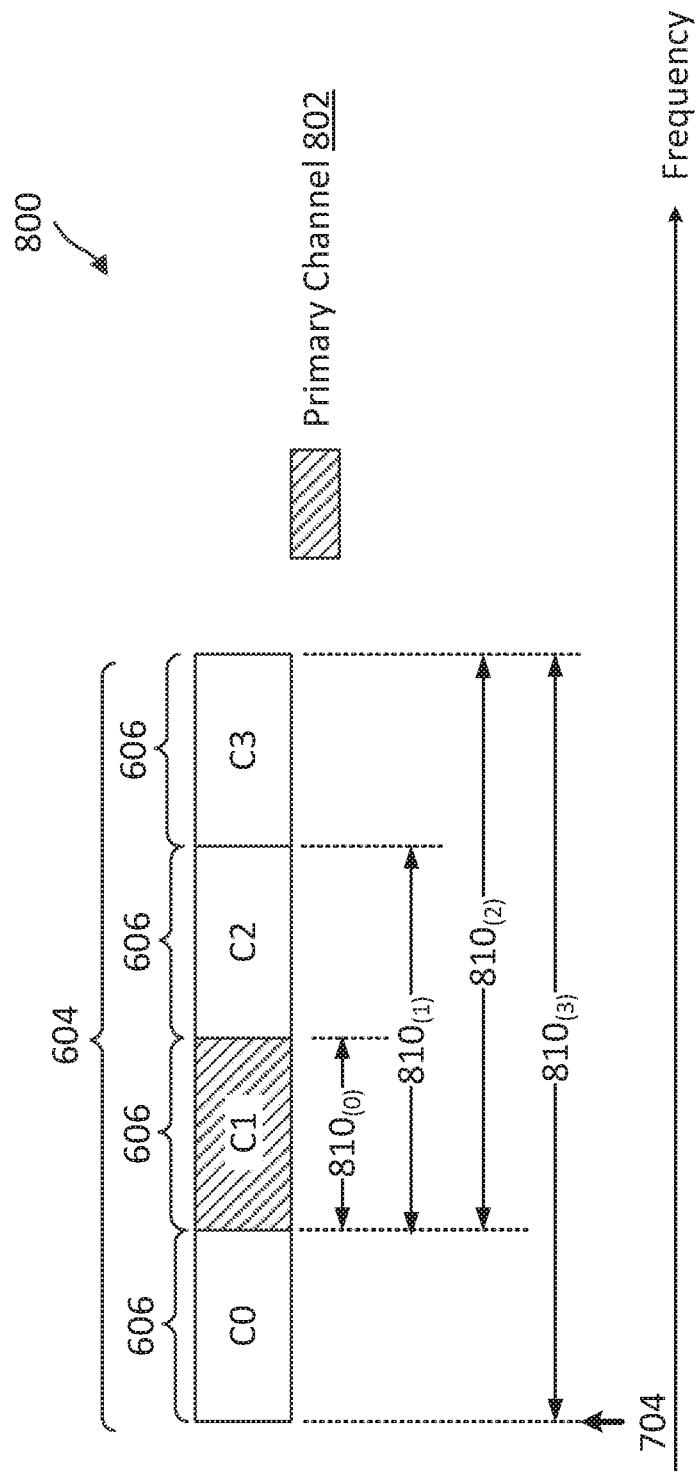
FIG. 8 illustrates a BWP configuration scheme according to some embodiments of the present disclosure.

FIG. 8 illustrates a BWP configuration scheme 800 according to some embodiments of the present disclosure. The scheme 800 can be employed by a BS such as the BS 105. The scheme 700 is illustrated using the same channel structure as in the channel configuration 602 of the scheme 600. The scheme 800 is similar to the scheme 700, but the scheme 800 selects a primary channel 802 at a different channel location. As shown, the primary channel 802 corresponds to the channel C1 606. Similar to the scheme 700, the scheme 800 may configure about four BWPs 810 in the frequency band 604 based on the primary channel 802. As shown, the BWP $810_{(0)}$ includes the channel C1 606, the BWP $810_{(1)}$ includes the channels C1 and C2 606, the BWP $710_{(2)}$ includes the channels C1, C2, and C3 606, and the BWP $810_{(3)}$ includes all channels 606. Similar to the scheme 700, channel accesses in any of the BWPs 810 may be dependent on an LBT result in the primary channel 802.

Figure 9:
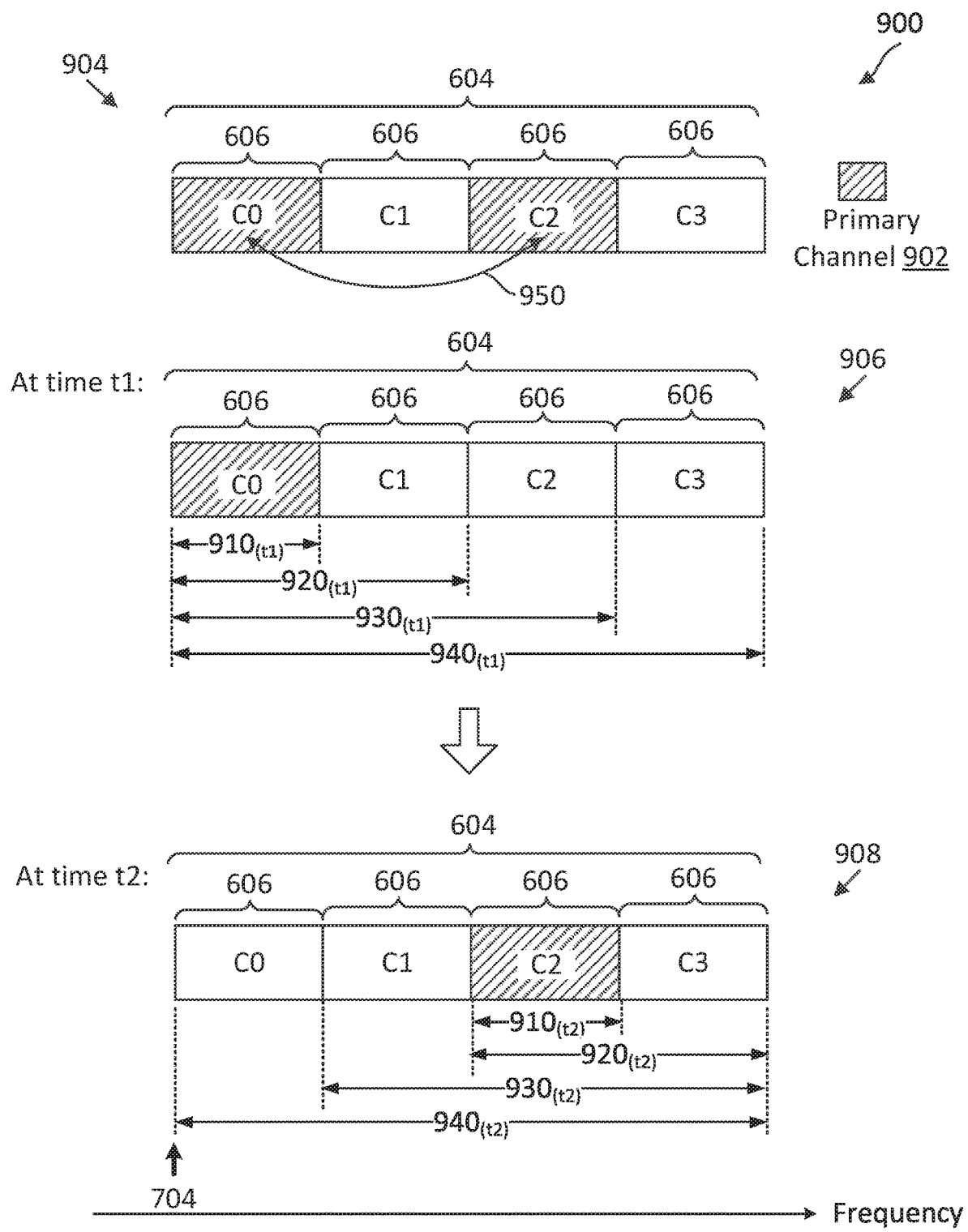
FIG. 9 illustrates a BWP configuration scheme with frequency-hopping according to some embodiments of the present disclosure.

FIG. 9 illustrates a BWP configuration scheme 900 with frequency-hopping according to some embodiments of the present disclosure. The scheme 900 can be employed by a BS such as the BS 105. The scheme 900 is illustrated using the same channel structure as in the channel configuration 602 of the scheme 600. The scheme 900 is substantially similar to the schemes 700 and 800, but may apply frequency-hopping to a primary channel 902 (e.g., the primary channels 702 and 802) instead of configuring BWPs semi-statically as in the schemes 700 and 800. The scheme 900 may determine a frequency-hopping pattern 904 for the primary channel 902. For example, the primary channel 902 may frequency-hop between the channel C0 606 and the channel C2 606 as shown by the arrow 950.

At time t1, the scheme 900 may configure the primary channel 902 at the channel C0 606 as shown by the configuration 906. The configuration 906 includes BWPs $910_{(t1)}$, $920_{(t1)}$, $930_{(t1)}$, and $940_{(t1)}$ similar to the BWPs $710_{(0)}$, $710_{(1)}$, $710_{(2)}$, and $710_{(3)}$, respectively, in the scheme 700.

At time t2, the scheme 900 may frequency-hopped the primary channel 902 from the channel C0 606 to the channel C2 606 as shown by the frequency-hopped configuration 908. The configuration 908 includes BWPs $910_{(t2)}$, $920_{(t2)}$, $930_{(t2)}$, and $940_{(t2)}$. The BWPs $910_{(t2)}$, $920_{(t2)}$, $930_{(t2)}$, and $940_{(t2)}$ are frequency-hopped based on the primary channel frequency-hopping pattern 904. As shown, the BWP $910_{(t2)}$ includes the channel C2 606, the BWP $920_{(t21)}$ includes the channels C2 and C3 606, the BWP $930_{(t2)}$ includes the channels C1, C2, and C3 606, and the BWP $940_{(t2)}$ includes all channels 606.

Similar to the schemes 700 and 800, channel accesses in any of the BWPs 910 may be dependent on an LBT result in the primary channel 902. In an embodiment, a BS may signal a primary frequency-hopping pattern (e.g., the frequency-hopping pattern 904) to UEs in a network. The BS and the UEs may perform LBT and communicate with each other based on the frequency-hopping pattern. While the scheme 900 illustrates the frequency-hopping pattern 904 with the primary channel 902 hopping between the channel C0 606 and the channel C2 606, the frequency-hopping pattern 904 can include any suitable hopping pattern. For example, the primary channel 902 may hop sequentially across the channels 606, from C0 to C1, from C1 to C2, from C2 to C3, and from C3 back to C0.

Regulatory authorities may govern certain unlicensed frequency bands. For example, a regulatory authority may set a transmission power spectral density (PSD) requirement or limit of about 10 decibel-milliwatt per megahertz (dBm/MHz) for a certain unlicensed frequency band. However, UEs (e.g., the UEs 115) and/or BSs (e.g., the BSs 105) are typically capable of transmitting at about 23 decibel-milliwatt (dBm). One approach to allowing a node (a UE or a BS) to transmit at a higher power, for example, up to the full power of about 23 dBm, while meeting a PSD requirement is to allocate resources in disjoint frequency blocks so that a transmission signal may be spread over a wider BW. For example, an allocation may include a set of interlaced frequency resources (e.g., the PRBs 202) spaced apart from each other over a frequency band (e.g., the frequency bands 210 and 604) and interlacing with another set of frequency resources. A set of interlaced frequency resources may be referred to as frequency interlaces.

In some embodiments, the number of frequency interlaces and/or the number of frequency resources in a frequency interlace may vary depending on the BW of the frequency band and the BW of the frequency resources. For example, a 10 MHz BWP (e.g., the BWPs 710, 810, 910, 920, 930, and 940) may include about 5 frequency interlaces, each including about 10 PRBs uniformly spaced apart by about 5 PRBs, whereas a 20 MHz BWP may include about 10 frequency interlaces, each including about 10 PRBS uniformly spaced apart by about 10 PRBs. Thus, different BWs may have different frequency-interlaced structures. The different frequency-interlaced structures may cause a frequency interlace in one BWP to overlap with a frequency interlace in another BWP. Thus, multiplexing different UEs configured with different BWPs can be complex. One approach to overcoming such complexity is to configure non-overlapping cell-specific BWPs and configure frequency interlaces within each non-overlapping BWP. A BS may configure a UE with an active BWP and may allocate a frequency interlace within the active BWP for communications with the UE. However, such an approach may have a limited flexibility.

Figure 10:
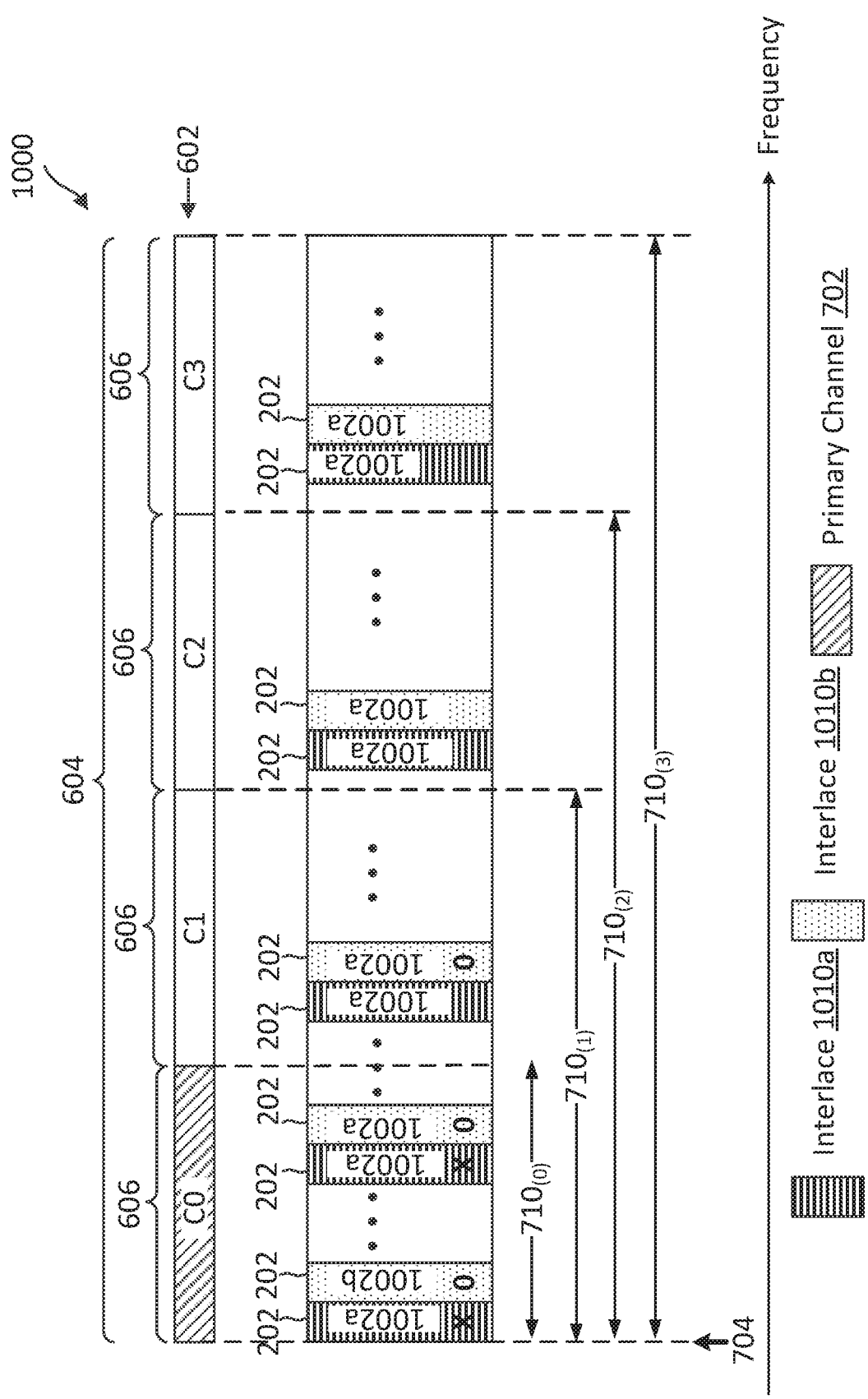
FIG. 10 illustrates a BWP configuration scheme with interlaced-based allocations according to some embodiments of the present disclosure.

FIG. 10 illustrates a BWP configuration scheme 1000 with interlaced-based allocations according to some embodiments of the present disclosure. The scheme 1000 can be employed by a BS such as the BS 105. The scheme 1000 is illustrated using the same channel structure as in the channel configuration 602 of the scheme 600 and the same BWP configuration as in the scheme 700. The scheme 1000 illustrates a frequency-interlaced structure that may overcome the flexibility limitation described above. The scheme 1000 can be used in conjunction with the BWP configurations shown in the schemes 700, 800, and 900. The scheme 1000 may partition the frequency band 604 into a plurality of frequency interlaces 1010 at a granularity-level of a PRB 202. For simplicity of illustration and discussion, FIG. 10 illustrates two frequency interlaces 1010a and 1010b, though it will be recognized that embodiments of the present disclosure may scale to include any suitable number of frequency interlaces 1010 (e.g., about 5, 10, 20, or more) depending on the BW of the frequency band 604.

Each frequency interlace 1010 includes a set of interlaced frequency resources 1002 (e.g., PRBs 202) spaced apart from each other in the frequency band 604. For example, the frequency interlace 1010a may include a set of frequency resources 1002a, whereas the frequency interlace 1010b may include another set of frequency resources 1002b frequency-interlaced with the frequency resources 1002a. The frequency interlaces 1010 may include a uniform pattern, where the frequency resources 1002 within a frequency interlace 1010 are uniformly spaced across the frequency band 604. Accordingly, the number of frequency resources 1002 in a frequency interlace 1010 may be dependent on the bandwidth of the frequency band 604.

As shown in FIG. 10, the PRBs 202 are defined with respect to the reference starting subcarrier 704. Thus, the set of frequency resources 1002 or the frequency interlaces 1010 are configured based on the reference starting subcarrier 704. Accordingly, the reference starting subcarrier 704 is a reference for the frequency interlaces 1010 definition.

The scheme 1000 may schedule resources in units of frequency interlaces 1010. For example, a BS may configure a first UE with an active BWP $710_{(0)}$ and a second UE with an active BWP $710_{(1)}$. The BS may schedule the frequency interlace 1010a for the first UE and the frequency interlace 1010b for the second UE. The BS may communicate with the first UE using the frequency resources 1002a of the frequency interlace 1010a within the active BWP $710_{(0)}$ marked with the symbols X. The BS may communicate with the second UE using the frequency resources 1002b of the frequency interlace 1010b within the active BWP $710_{(1)}$ marked with the symbols 0. As can be seen, the allocations for the first UE and the second UE are non-overlapping.

In some embodiments, a BWP 710 may be configured with guard bands (e.g., the guard bands 312, 322, and 332) at the left edge and at the right edge of the BWP 710. In such embodiments, PRBs 202 frequency resources 1002 of frequency interlaces at edges of the BWP 710 may not be used for allocations, as described in greater detail herein. While the scheme 1000 is described in the context of the scheme 700, the scheme 1000 can be used in conjunction with the schemes 600, 800, and/or 900 described above with respect to FIGS. 6, 8, and 9, respectively.

Figure 11:
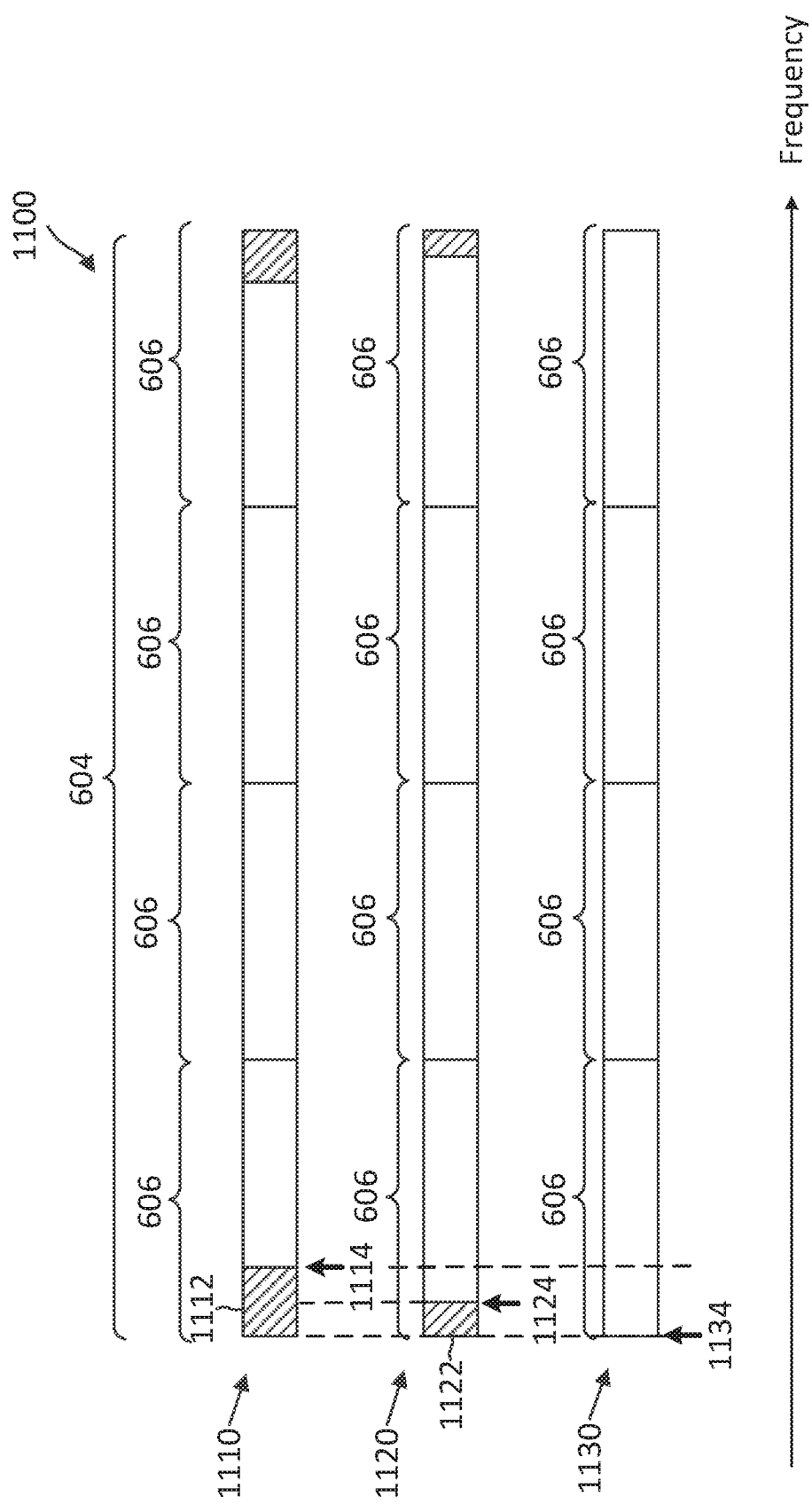
FIG. 11 illustrates a reference resource block configuration scheme according to some embodiments of the present disclosure.

FIG. 11 illustrates a reference resource block configuration scheme 1100 according to some embodiments of the present disclosure. The scheme 1100 can be employed by a BS such as the BS 105. The scheme 1100 is illustrated using the same channel structure as in the channel configuration 602 of the scheme 600. In FIG. 11, the x-axis represents frequency in some constant units. As shown in the schemes 600-1000, a frequency band may include BWPs (e.g., the BWPs 610, 710, 810, or 910) of different BWs. The different BWPs with different BWs may require guard bands (e.g., the guard bands 312, 322, and 332) of different sizes or BWs. For example, as shown in the configuration 300 described above with respect to FIG. 3, a wider BW may require a wider guard band. The scheme 1100 may select a common reference PRB (e.g., the common reference PRBs 204 and 704) for a PRB grid, where channels (e.g., the channels 606) and BWPs may be mapped to the PRB grid.

In the configuration 1110, the scheme 1100 configures a reference starting subcarrier 1114 (e.g., the reference starting subcarrier 704) for a common reference PRB (e.g., the common reference PRB 204) with respect to a guard band 1112 for the BWP with the widest or largest BW in the frequency band 604. For example, the configuration 1110 may select the reference starting subcarrier 1114 for the common reference PRB based on a BWP (e.g., the BWP $710_{(3)}$, $810_{(3)}$, and 940) including all four channels 606. As shown, the reference starting subcarrier 1114 is at a frequency location after the guard band 1112.

In the configuration 1120, the scheme 1100 configures a reference starting subcarrier 1124 for a common reference PRB with respect to a guard band 1122 for the BWP with the narrowest or smallest BW in the frequency band 604. For example, the configuration 1110 may select the reference starting subcarrier 1124 for the common reference PRB based on the BWP (e.g., the BWPs $710_{(0)}$, $810_{(0)}$, and 910) including one channel 606. As shown, the reference starting subcarrier 1124 is at a frequency location after the guard band 1122.

In the configuration 1130, the scheme 1100 configures a reference starting subcarrier 1134 for the common reference PRB with respect to the BW of the system frequency band 604 with a zero guard band.

The different configurations 1110, 1120, and 1130 may provide different BW efficiencies. For example, the configuration 1110 excluding the widest guard band 1112 may cause a BWP with a narrower BW to have a lower BW efficiency since the BWP with the narrower BW may require a narrower guard band than the guard band 1112. The configuration 1120 excluding the narrowest guard band 1122 may cause a BWP with a wider BW to have a lower BW efficiency since the BWP with the wider BW may require a wider guard band than the guard band 1122. A PRB including any portion of a guard band may not be used for an allocation. Thus, at least the first PRB at the band edge may not be usable for an allocation since at least some of the subcarriers may be part of the wider guard band. Similarly, when using the configuration 1130, at least the first PRB at the band edge may not be usable for an allocation for any BWP since at least some of the subcarriers may be configured as part of a guard band. As can be seen, the number of usable PRBs in a certain BWP may be dependent on the frequency starting location (e.g., the reference starting subcarrier 1114, 1124, or 1134) of a common reference PRB.

Figure 12:
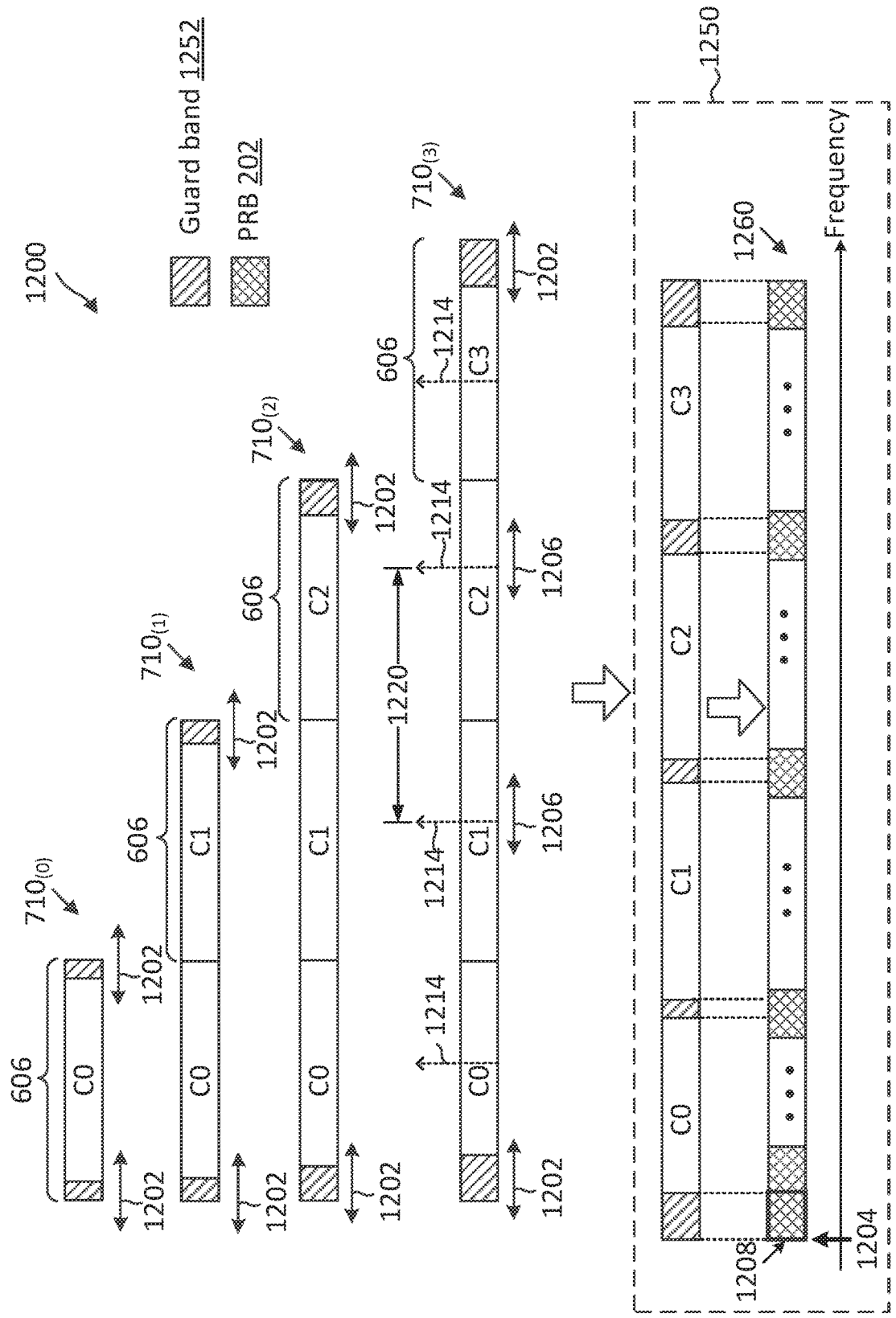
FIG. 12 illustrates a BWP configuration scheme with reference resource block consideration according to some embodiments of the present disclosure.

FIG. 12 illustrates a BWP configuration scheme 1200 with reference resource block consideration according to some embodiments of the present disclosure. The scheme 1200 can be employed by a BS such as the BS 105. The scheme 1200 is illustrated using the same channel structure as in the channel configuration 602 of the scheme 600 and the same BWP configurations as in the scheme 700. In FIG. 12, the x-axis represents frequency in some constant units. The scheme 1200 may select a reference starting subcarrier (e.g., the reference starting subcarriers 704, 1114, 1124, and 1134) for a common reference PRB 1208 (e.g., the common reference PRB 204) in a frequency band (e.g., the frequency bands 604) by considering guard bands 1252 (e.g., the guard bands 312, 322, 332, 1112, and 1122) for each BWP 710 and center frequencies 1214 of each channel 606.

As described above, each channel 606 may include a group of PRBs 202 including subcarriers of a particular SCS. The scheme 1200 may select a reference starting subcarrier 1204 for the common reference PRB 1208 such that the center frequencies 1214 of the channels 606 are spaced apart by a frequency separation 1220 that is an integer multiple of the SCS (e.g., as shown by the arrow 1206).

In addition, the scheme 1200 may adjust the sizes or BWs of the guard bands 1252 and may select a reference starting subcarrier 1204 for the common reference PRB 1208 such that each guard band 1252 for each BWP 710 can provide a sufficient adjacent channel protection and can be within a least number of PRBs 202 (e.g., as shown by the arrow 1202). As described above, a PRB 202 including any guard band portion may not be used for an allocation. In other words, the scheme 1200 may select the reference starting subcarrier 1204 for the common reference PRB 1208 to maximize BW efficiencies for the BWPs 710. For example, the scheme 1200 may select the reference starting subcarrier 1204 for the common reference PRB 1208 based on a metric or cost function associated with a number of usable PRBs 202 in each BWP 710. A usable PRB 202 is a PRB that is non-overlapping with any portion of the guard bands 1252. In some embodiments, the scheme 1200 may include a metric including a weighted sum of the number of usable PRBs 202 in the BWPs 710.

After determining a reference starting subcarrier 1204 for the common reference PRB 1208, the scheme 1200 configures a PRB grid 1260 with respect to the common reference PRB 1208 and maps the channels 606 to the PRB grid 1260 as shown in the mapping 1250. For example, each of the guard bands 1252 is within one PRB 202.

While the scheme 1200 is described in the context of the scheme 700, the scheme 1200 can be used in conjunction with the schemes 600, 800, 900, and/or 1000 described above with respect to FIGS. 6, 8, 9, and/or 10, respectively. In an embodiment, when employing the scheme 1200 in conjunction with the scheme 600, the scheme 1200 may determine guard bands for non-contiguous channels at edges of the non-contiguous channels since another device may transmit in a channel between the non-contiguous channels. For example, in the BWP 610$_{(12)}$, a left guard band may be inserted at the left edge of the channel C2 606 and a right guard band may be inserted at the right edge of the channel C0 606 since another device may transmit in the channel C1 606.

Figure 13:
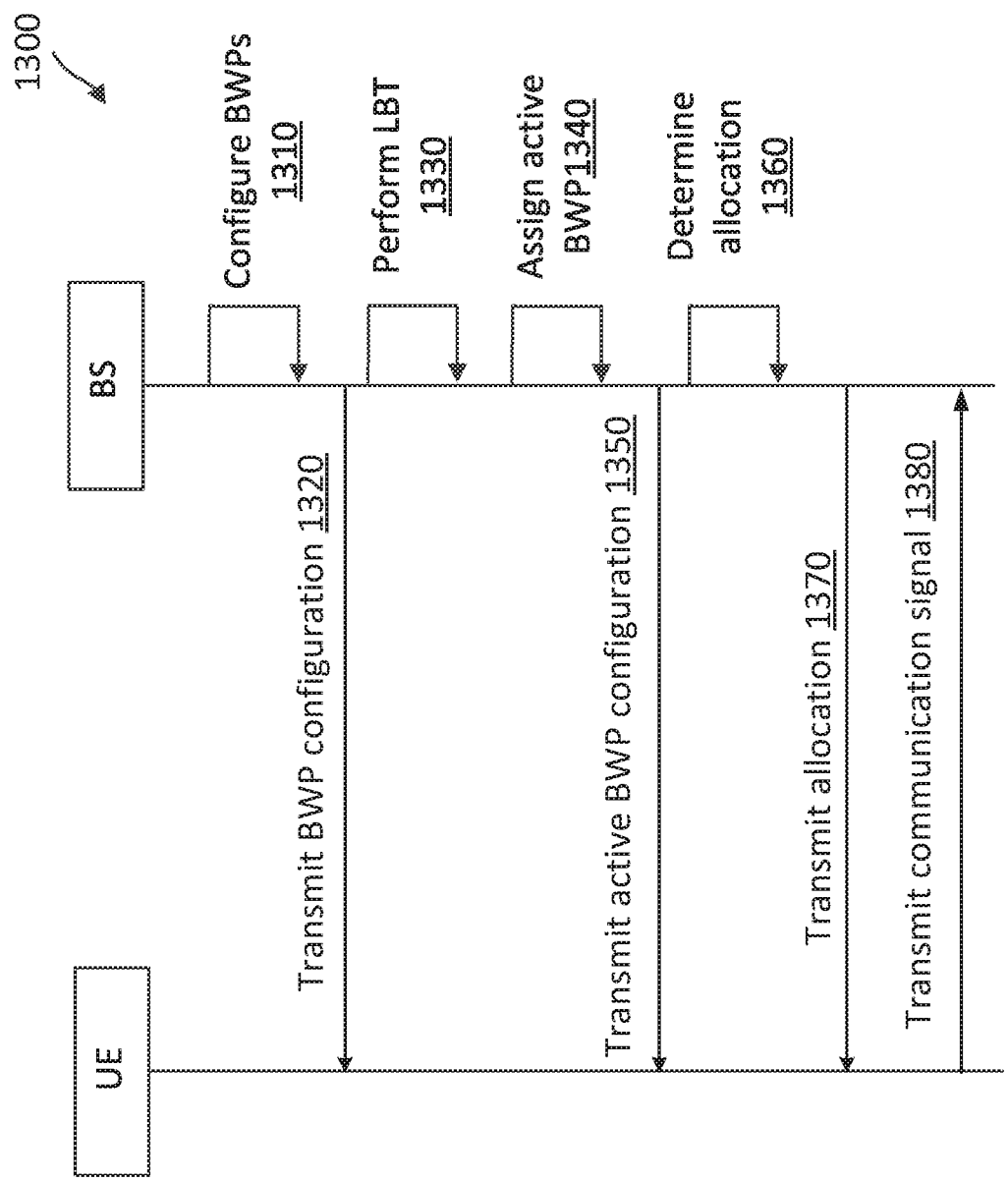
FIG. 13 is a signaling diagram of a BWP-based communication method according to some embodiments of the present disclosure.

FIG. 13 is a signaling diagram of a BWP-based communication method 1300 according to some embodiments of the present disclosure. The method 1300 is implemented by a BS (e.g., the BSs 105 and 500) and a UE (e.g., the UEs 115 and 400) in a network (e.g., the network 100). Steps of the method 1300 can be executed by computing devices (e.g., a processor, processing circuit, and/or other suitable component) of the BS and the UE. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the BS determines a BWP configuration. The BS may partition a frequency band (e.g., the frequency band 604) into a plurality of channels (e.g., the channels 606). The BS may determine a number of BWPs (e.g., the BWPs 610, 710, 810, 910, 920, 930, and 940) in the frequency band based on an expected channel access pattern associated with an LBT in the frequency band. In some embodiments, one or more of the BWPs may include non-contiguous channels, for example, as shown in the scheme 600. In some embodiments, the BS may not allow non-contiguous channels in a BWP, for example, as shown in the scheme 700, 800, and/or 900. In some embodiments, the BS may configure the BWPs based on a primary channel (e.g., the primary channels 702, 802, and 902) used for LBT, for example, by employing the schemes 700 and 800.

The BS may select a reference starting subcarrier (e.g., the reference starting subcarriers 704, 1114, 1124, 1134, and 1204) or a common reference PRB (e.g., the PRB 204 and 1208) for a PRB grid (e.g., the PRB grid 1260) and may map the BWPs to the PRB grid, for example, by employing the schemes 1100 and/or 1200. In an embodiment, the BS may further determine a frequency-hopping pattern (e.g., the frequency-hopping pattern 904) for the primary channel, for example, as shown in the scheme 900. In an embodiment, the BS may further configure a plurality of frequency interlaces (e.g., the frequency interlaces 1010), for example, as shown in the scheme 1000.

At step 1320, the BS transmits a BWP configuration to the UE. The BWP configuration may indicate information associated with the configured BWPs and/or frequency interlaces (e.g., the frequency interlaces 1010). The BS may transmit the BWP configuration in an RRC message.

At step 1330, the BS performs an LBT in one or more channels. For example, the LBT may indicate a channel clear status for one or more channels. In some embodiments, when the BWPs are configured based on a primary channel, the BS may perform the LBT based on the primary channel.

At step 1340, upon completing a successful LBT, the BS assigns an active BWP including channels that pass the LBT to the UE.

At step 1350, the BS transmits an active BWP configuration to the UE. The configuration may include the assigned active BWP.

At step 1360, the BS determines an allocation for the UE. The BS allocates resources within the active BWP for the UE. In some embodiments, the BS may allocate a frequency interlace for the UE.

At step 1370, the BS transmits the allocation to the UE, for example, in the form of downlink control information (DCI) in a physical downlink control channel (PDCCH).

At step 1380, the UE transmits a communication signal to the BS using resources indicated in the allocation. When the allocation indicates an allocated frequency interlace, the UE may transmit the communication signal using portions of the frequency interlace within the active BWP. In some embodiments, the UE may optionally perform an LBT in the assigned active BWP prior to transmitting the communication signal. In some instances, the communication signal may include at least one of a PUCCH signal or a PUSCH signal.

Figure 14:
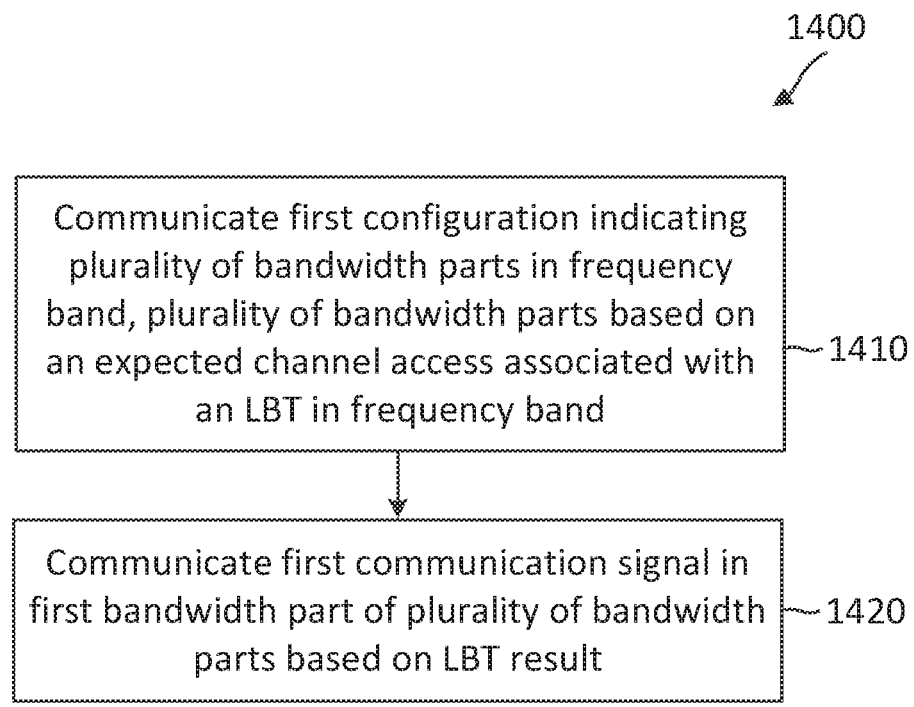
FIG. 14 is a flow diagram of a BWP-based communication method according to embodiments of the present disclosure.

FIG. 14 is a flow diagram of a BWP-based communication method according to embodiments of the present disclosure. Steps of the method 1400 can be executed by a computing device (e.g., a processor, processing circuit, and/or other suitable component) of a wireless communication device or other suitable means for performing the steps. In an example, a wireless communication device, such as the UE 115 or UE 400, may utilize one or more components, such as the processor 402, the memory 404, the BWP-based communication module 408, the transceiver 410, the modem 412, and the one or more antennas 416, to execute the steps of method 1400. In another example, a wireless communication device, such as the BS 105 or BS 500, may utilize one or more components, such as the processor 502, the memory 504, the BWP-based communication module 408, the transceiver 510, the modem 512, and the one or more antennas 516, to execute the steps of method 1400. The method 1400 may employ similar mechanisms as in the schemes 700, 800, 900, 1000, 1100, 1200, and/or the method 1300 described with respect to FIGS. 7, 8, 9, 10, 10, 11, 12, and/or 13, respectively. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the method 1400 includes communicating, by a first wireless communication device with a second wireless communication device, a first configuration indicating a plurality of BWPs (e.g., the BWPs 710, 810, 910, 920, 930, and 940) in a frequency band (e.g., the frequency band 604), the plurality of BWPs based on an expected channel access associated with an LBT in the frequency band. In one embodiment, the first wireless communication device may correspond to a BS and the second wireless communication device may correspond to a UE. In another embodiment, the first wireless communication device may correspond to a UE and the second wireless communication device may correspond to a BS.

At step 1420, the method 1400 includes communicating, by the first wireless communication device with the second wireless communication device, a first communication signal in a first BWP (e.g., an active BWP) of the plurality of BWPs based on an LBT result. In some instances, the first communication signal may include at least one of a PUCCH signal or a PUSCH signal.

In an embodiment, the frequency band may include a plurality of channels (e.g., the channels 606). Each BWP of the plurality of BWPs may include one or more channels of the plurality of channels. In an embodiment, the first bandwidth part includes at least two non-contiguous channels of the plurality of channels. In an embodiment, the plurality of channels includes a common primary channel. Each BWP of the plurality of BWPs may include the common primary channel. Each BWP of the plurality of BWP may include one or more contiguous channels of the plurality of channels.

In an embodiment, the first wireless communication device may further determine a reference starting subcarrier (e.g., the reference starting subcarriers 704, 1114, 1124, 1134, and 1204) in the frequency band for a plurality of resource blocks (e.g., the PRBs 202), each including a plurality of subcarriers in the frequency band. Each channel of the plurality of channels includes one or more resource blocks of the plurality of resource blocks.

In an embodiment, the first wireless communication device may further determine a plurality of guard bands (e.g., the guard bands 1252) for the plurality of BWPs. In an embodiment, the determination can be based on a metric associated with a number of resource blocks in each bandwidth part that are non-overlapping with a resource block including a portion of the plurality of guard bands. In an embodiment, the determination may be such that such that center frequencies (e.g., the center frequencies 1214) of the plurality of channels are spaced apart from each other in the frequency band by an integer multiple of a subcarrier spacing of the plurality of subcarriers. In an embodiment, the determination can be based on a guard band of a BWP including a smallest bandwidth among the plurality of bandwidth parts, for example, as shown in the configuration 1120. In an embodiment, the determination can be based on a guard band of a BWP including a widest bandwidth among the plurality of bandwidth parts, for example, as shown in the configuration 1110.

In an embodiment, the frequency band includes at least a first set of resource blocks (e.g., the frequency interlaces 1010a) interlaced with a second set of resource blocks (e.g., the frequency interlaces 1010a). In such an embodiment, the first wireless communication device may communicate the first communication signal with the second wireless communication device in at least a portion of the first set of resource blocks within the first BWP.

In an embodiment, the first wireless communication device may communicate a second configuration with the second wireless communication device. The second configuration may indicate a frequency-hopping pattern (e.g., the frequency-hopping pattern 904) for the common primary channel. The first wireless communication may apply frequency-hopping to the first BWP based on the frequency-hopping pattern. The first wireless communication device may communicate a second communication signal with the second wireless communication device in the frequency-hopped first bandwidth part.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising communicating, by a first wireless communication device with a second wireless communication device, a first configuration indicating a plurality of bandwidth parts in a frequency band, the plurality of bandwidth parts based on an expected channel access pattern associated with a listen-before-talk (LBT) in the frequency band; and communicating, by the first wireless communication device with the second wireless communication device, a first communication signal in a first bandwidth part of the plurality of bandwidth parts based on an LBT result.

In some embodiments, wherein the frequency band includes a plurality of channels, and wherein each bandwidth part of the plurality of bandwidth parts includes one or more channels of the plurality of channels. In some embodiments, wherein the first bandwidth part includes at least two non-contiguous channels of the plurality of channels. In some embodiments, wherein the plurality of channels includes a common primary channel, and wherein each bandwidth part of the plurality of bandwidth parts includes the common primary channel. In some embodiments, wherein each bandwidth includes one or more contiguous channels of the plurality of channels. In some embodiments, the method further comprises communicating, by the first wireless communication device with the second wireless communication device, a second configuration indicating a frequency-hopping pattern for the common primary channel; frequency-hopping, by the first wireless communication device, the first bandwidth part based on the frequency-hopping pattern; and communicating, by the first wireless communication device with the second wireless communication device, a second communication signal in the frequency-hopped first bandwidth part. In some embodiments, the method further comprises determining, by the first wireless communication device, a reference starting subcarrier in the frequency band for a plurality of resource blocks, each including a plurality of subcarriers in the frequency band, wherein each channel of the plurality of channels includes one or more resource blocks of the plurality of resource blocks. In some embodiments, the method further comprises determining, by the first wireless communication device, a plurality of guard bands for the plurality of bandwidth parts, wherein the determining the reference starting subcarrier is based on a metric associated with a number of resource blocks in each bandwidth part that are non-overlapping with a resource block including a portion of the plurality of guard bands. In some embodiments, wherein the determining the plurality of guard bands further includes determining the plurality of guard bands such that center frequencies of the plurality of channels are spaced apart from each other in the frequency band by an integer multiple of a subcarrier spacing of the plurality of subcarriers. In some embodiments, wherein the determining is based on a guard band of a bandwidth part including a largest bandwidth among the plurality of bandwidth parts. In some embodiments, wherein the determining is based on a guard band of a bandwidth part including a smallest bandwidth among the plurality of bandwidth parts. In some embodiments, wherein the frequency band includes at least a first set of resource blocks interlaced with a second set of resource blocks, and wherein the communicating includes communicating, by the first wireless communication device with the second wireless communication device, the first communication signal in at least a portion of the first set of resource blocks within the first bandwidth part. In some embodiments, the method further comprises determining, by the first wireless communication device, the first set of resource blocks and the second set of resource blocks based on a reference starting subcarrier in the frequency band.

Further embodiments of the present disclosure include an apparatus comprising a transceiver configured to communicate, with a second wireless communication device, a first configuration indicating a plurality of bandwidth parts in a frequency band, the plurality of bandwidth parts based on an expected channel access pattern associated with a listen-before-talk (LBT) in the frequency band; and communicate, with the second wireless communication device, a first communication signal in a first bandwidth part of the plurality of bandwidth parts based on an LBT result.

In some embodiments, wherein the frequency band includes a plurality of channels, and wherein each bandwidth part of the plurality of bandwidth parts includes one or more channels of the plurality of channels. In some embodiments, wherein the first bandwidth part includes at least two non-contiguous channels of the plurality of channels. In some embodiments, wherein the plurality of channels includes a common primary channel, and wherein each bandwidth part of the plurality of bandwidth parts includes the common primary channel. In some embodiments, wherein each bandwidth includes one or more contiguous channels of the plurality of channels. In some embodiments, wherein the transceiver is further configured to communicate, with the second wireless communication device, a second configuration indicating a frequency-hopping pattern for the common primary channel, wherein the apparatus further includes a processor configured to a apply frequency-hopping to the first bandwidth part based on a frequency-hopping pattern, and wherein the transceiver is further configured to communicate, with the second wireless communication device, a second communication signal in the frequency-hopped first bandwidth part. In some embodiments, the apparatus further comprises a processor configured to determine a reference starting subcarrier in the frequency band for a plurality of resource blocks, each including a plurality of subcarriers in the frequency band, wherein each channel of the plurality of channels includes one or more resource blocks of the plurality of resource blocks. In some embodiments, the apparatus further comprises a processor configured to determine a plurality of guard bands for the plurality of bandwidth parts, wherein the reference starting subcarrier is determined further based on a metric associated with a number of resource blocks in each bandwidth part that are non-overlapping with a resource block including a portion of the plurality of guard bands. In some embodiments, wherein the processor is further configured to determining the plurality of guard bands such that center frequencies of the plurality of channels are spaced apart from each other in the frequency band by an integer multiple of a subcarrier spacing of the plurality of subcarriers. In some embodiments, wherein the reference starting subcarrier is determined further based on a guard band of a bandwidth part including a largest bandwidth among the plurality of bandwidth parts. In some embodiments, where the reference starting subcarrier is determined further based on a guard band of a bandwidth part including a smallest bandwidth among the plurality of bandwidth parts. In some embodiments, wherein the frequency band includes at least a first set of resource blocks interlaced with a second set of resource blocks, and wherein the transceiver is further configured to communicating the first communication signal in at least a portion of the first set of resource blocks within the first bandwidth part. In some embodiments, the apparatus further comprises a processor configured to determine the first set of resource blocks and the second set of resource blocks based on a reference starting subcarrier in the frequency band.

Further embodiments of the present disclosure include a computer-readable medium having program code recorded thereon, the program code comprising code for causing a first wireless communication device to communicate, with a second wireless communication device, a first configuration indicating a plurality of bandwidth parts in a frequency band, the plurality of bandwidth parts based on an expected channel access pattern associated with a listen-before-talk (LBT) in the frequency band; and code for causing the first wireless communication device to communicate, with the second wireless communication device, a first communication signal in a first bandwidth part of the plurality of bandwidth parts based on an LBT result.

In some embodiments, wherein the frequency band includes a plurality of channels, and wherein each bandwidth part of the plurality of bandwidth parts includes one or more channels of the plurality of channels. In some embodiments, wherein the first bandwidth part includes at least two non-contiguous channels of the plurality of channels. In some embodiments, wherein the plurality of channels includes a common primary channel, and wherein each bandwidth part of the plurality of bandwidth parts includes the common primary channel. In some embodiments, wherein each bandwidth includes one or more contiguous channels of the plurality of channels. In some embodiments, the computer-readable medium further comprises code for causing the first wireless communication device to communicate, with the second wireless communication device, a second configuration indicating a frequency-hopping pattern for the common primary channel; code for causing the first wireless communication device to apply frequency-hopping to the first bandwidth part based on the frequency-hopping pattern; and code for causing the first wireless communication device to communicate, with the second wireless communication device, a second communication signal in the frequency-hopped first bandwidth part. In some embodiments, the computer-readable medium further comprises code for causing the first wireless communication device to determine a reference starting subcarrier in the frequency band for a plurality of resource blocks, each including a plurality of subcarriers in the frequency band, wherein each channel of the plurality of channels includes one or more resource blocks of the plurality of resource blocks. In some embodiments, the computer-readable medium further comprises code for causing the first wireless communication device to determine a plurality of guard bands for the plurality of bandwidth parts, wherein the code for causing the first wireless communication device to determine the reference starting subcarrier is further configured to determine reference starting subcarrier based on a metric associated with a number of resource blocks in each bandwidth part that are non-overlapping with a resource block including a portion of the plurality of guard bands. In some embodiments, wherein the code for causing the first wireless communication device to determine the plurality of guard bands is further configured to determine the plurality of guard bands such that center frequencies of the plurality of channels are spaced apart from each other in the frequency band by an integer multiple of a subcarrier spacing of the plurality of subcarriers. In some embodiments, wherein the code for causing the first wireless communication device to determine the reference starting subcarrier is further configured to determine the reference starting subcarrier based on a guard band of a bandwidth part including a largest bandwidth among the plurality of bandwidth parts. In some embodiments, wherein the code for causing the first wireless communication device to determine the reference starting subcarrier is further configured to determine the reference starting subcarrier based on a guard band of a bandwidth part including a smallest bandwidth among the plurality of bandwidth parts. In some embodiments, wherein the frequency band includes at least a first set of resource blocks interlaced with a second set of resource blocks, and wherein the code for causing the first wireless communication device to communicate the first communication signal is further configured to communicate, with the second wireless communication device, the first communication signal in at least a portion of the first set of resource blocks within the first bandwidth part. In some embodiments, the computer-readable medium further comprises code for causing the first wireless communication device to determine the first set of resource blocks and the second set of resource blocks based on a reference starting subcarrier in the frequency band.

Further embodiments of the present disclosure include an apparatus comprising means for communicating, with a second wireless communication device, a first configuration indicating a plurality of bandwidth parts in a frequency band, the plurality of bandwidth parts based on an expected channel access pattern associated with a listen-before-talk (LBT) in the frequency band; and means for communicating, with the second wireless communication device, a first communication signal in a first bandwidth part of the plurality of bandwidth parts based on an LBT result.

In some embodiments, wherein the frequency band includes a plurality of channels, and wherein each bandwidth part of the plurality of bandwidth parts includes one or more channels of the plurality of channels. In some embodiments, wherein the first bandwidth part includes at least two non-contiguous channels of the plurality of channels. In some embodiments, wherein the plurality of channels includes a common primary channel, and wherein each bandwidth part of the plurality of bandwidth parts includes the common primary channel. In some embodiments, wherein each bandwidth includes one or more contiguous channels of the plurality of channels. In some embodiments, the apparatus further comprises means for communicating, with the second wireless communication device, a second configuration indicating a frequency-hopping pattern for the common primary channel; means for frequency-hopping to the first bandwidth part based on the frequency-hopping pattern; and means for communicating, with the second wireless communication device, a second communication signal in the frequency-hopped first bandwidth part. In some embodiments, the apparatus further comprises means for determining a reference starting subcarrier in the frequency band for a plurality of resource blocks, each including a plurality of subcarriers in the frequency band, wherein each channel of the plurality of channels includes one or more resource blocks of the plurality of resource blocks. In some embodiments, the apparatus further comprises means for determining a plurality of guard bands for the plurality of bandwidth parts, wherein the means for determining the reference starting subcarrier is further configured to determine reference starting subcarrier based on a metric associated with a number of resource blocks in each bandwidth part that are non-overlapping with a resource block including a portion of the plurality of guard bands. In some embodiments, wherein the means for determining the plurality of guard bands is further configured to determine the plurality of guard bands such that center frequencies of the plurality of channels are spaced apart from each other in the frequency band by an integer multiple of a subcarrier spacing of the plurality of subcarriers. In some embodiments, wherein the means for determining the reference starting subcarrier is further configured to determine the reference starting subcarrier based on a guard band of a bandwidth part including a largest bandwidth among the plurality of bandwidth parts. In some embodiments, wherein the means for determining the reference starting subcarrier is further configured to determine the reference starting subcarrier based on a guard band of a bandwidth part including a smallest bandwidth among the plurality of bandwidth parts. In some embodiments, wherein the frequency band includes at least a first set of resource blocks interlaced with a second set of resource blocks, and wherein the means for communicating the first communication signal is further configured to communicate, with the second wireless communication device, the first communication signal in at least a portion of the first set of resource blocks within the first bandwidth part. In some embodiments, the apparatus further comprises means for determining the first set of resource blocks and the second set of resource blocks based on a reference starting subcarrier in the frequency band.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
communicating, by a first wireless communication device with a second wireless communication device, a first configuration indicating a plurality of bandwidth parts in a frequency band, the frequency band including at least a first set of interlaced frequency resource blocks interlaced with a second set of interlaced frequency resource blocks across the plurality of bandwidth parts, wherein the first set of interlaced frequency resource blocks and the second set of interlaced frequency resource blocks across the plurality of bandwidth parts are defined with respect to a common frequency resource block; and
communicating, by the first wireless communication device with the second wireless communication device, a first communication signal using at least a portion of the first set of interlaced frequency resource blocks within a first bandwidth part of the plurality of bandwidth parts based on a first listen-before-talk (LBT) result.

2. The method of claim 1, wherein the first set of interlaced frequency resource blocks are uniformly spaced apart from each other in the frequency band.

3. The method of claim 1, further comprising:
determining, by the first wireless communication device, a reference starting subcarrier in the frequency band for a plurality of resource blocks,
wherein the plurality of resource blocks includes the first set of interlaced frequency resource blocks and the second set of interlaced frequency resource blocks.

4. The method of claim 3, wherein the frequency band includes a plurality of channels including the plurality of resource blocks, and wherein each bandwidth part of the plurality of bandwidth parts includes one or more channels of the plurality of channels.

5. The method of claim 4, further comprising:
determining, by the first wireless communication device, a plurality of guard bands for the plurality of bandwidth parts,
wherein the determining the reference starting subcarrier is based on a metric associated with a number of resource blocks in each bandwidth part that are non-overlapping with a resource block including a portion of the plurality of guard bands.

6. The method of claim 5, wherein the determining the plurality of guard bands further includes:
determining the plurality of guard bands such that center frequencies of the plurality of channels are spaced apart from each other in the frequency band by an integer multiple of a subcarrier spacing.

7. The method of claim 3, wherein the determining is based on a guard band of a bandwidth part including a largest bandwidth among the plurality of bandwidth parts.

8. The method of claim 3, wherein the determining is based on a guard band of a bandwidth part including a smallest bandwidth among the plurality of bandwidth parts.

9. The method of claim 1, further comprising:
communicating, by the first wireless communication device with a third wireless communication device, a second communication signal using at least a portion of the second set of interlaced frequency resource blocks within a second bandwidth part of the plurality of bandwidth parts based on a second LBT result,
wherein the second bandwidth part is at least partially overlapping with the first bandwidth part,
wherein the third wireless communication device is different from the second wireless communication device.

10. The method of claim 1, wherein:
the communicating the first configuration comprises:
receiving, by the first wireless communication device from the second wireless communication device, the first configuration indicating the plurality of bandwidth parts in the frequency band, wherein the first wireless communication device includes a user equipment and the second wireless communication device includes a base station; and
the communicating the first communication signal comprises:
transmitting, by the user equipment to the base station, the first communication signal using at least the portion of the first set of interlaced frequency resource blocks within the first bandwidth part of the plurality of bandwidth parts based on the first LBT result.

11. The method of claim 10, wherein the first LBT result is based on an LBT performed by the user equipment.

12. The method of claim 1, wherein:
the communicating the first configuration comprises:
transmitting, by the first wireless communication device to the second wireless communication device, the first configuration indicating the plurality of bandwidth parts in the frequency band, wherein the first wireless communication device includes a base station and the second wireless communication device includes a user equipment; and the communicating the first communication signal comprises:
receiving, by the base station from the user equipment, the first communication signal.

13. An apparatus comprising:
a transceiver; and
a processor in communication with the transceiver, wherein the apparatus is configured to:
communicate, with a first wireless communication device, a first configuration indicating a plurality of bandwidth parts in a frequency band, the frequency band including at least a first set of interlaced frequency resource blocks interlaced with a second set of interlaced frequency resource blocks across the plurality of bandwidth parts, wherein the first set of interlaced frequency resource blocks and the second set of interlaced frequency resource blocks for the plurality of bandwidth parts are defined with respect to a common resource block; and
communicate, with the first wireless communication device, a first communication signal using at least a portion of the first set of interlaced frequency resource blocks within a first bandwidth part of the plurality of bandwidth parts based on a first listen-before-talk (LBT) result.

14. The apparatus of claim 13, wherein the first set of interlaced frequency resource blocks are uniformly spaced apart from each other in the frequency band.

15. The apparatus of claim 13, wherein the apparatus is further configured to:
determine a reference starting subcarrier in the frequency band for a plurality of resource blocks,
wherein the plurality of resource blocks includes the first set of interlaced frequency resource blocks and the second set of interlaced frequency resource blocks.

16. The apparatus of claim 15, wherein the frequency band includes a plurality of channels including the plurality of resource blocks, and wherein each bandwidth part of the plurality of bandwidth parts includes one or more channels of the plurality of channels.

17. The apparatus of claim 16, wherein the apparatus is further configured to:
determine a plurality of guard bands for the plurality of bandwidth parts,
wherein the reference starting subcarrier is determined based on a metric associated with a number of resource blocks in each bandwidth part that are non-overlapping with a resource block including a portion of the plurality of guard bands.

18. The apparatus of claim 17, wherein the plurality of guard bands is determined such that center frequencies of the plurality of channels are spaced apart from each other in the frequency band by an integer multiple of a subcarrier spacing.

19. The apparatus of claim 15, wherein the reference starting subcarrier is determined further based on a guard band of a bandwidth part including a largest bandwidth among the plurality of bandwidth parts.

20. The apparatus of claim 15, wherein the reference starting subcarrier is determined further based on a guard band of a bandwidth part including a smallest bandwidth among the plurality of bandwidth parts.

21. The apparatus of claim 13, wherein the apparatus is further configured to:
communicate, with a second wireless communication device, a second communication signal using at least a portion of the second set of interlaced frequency resource blocks within a second bandwidth part of the plurality of bandwidth parts based on a second LBT result,
wherein the second bandwidth part is at least partially overlapping with the first bandwidth part,
wherein the first wireless communication device is different from the second wireless communication device.

22. The apparatus of claim 13, wherein the apparatus is further configured to:
communicate the first configuration by:
receiving, from the first wireless communication device, the first configuration indicating the plurality of bandwidth parts in the frequency band, wherein the first wireless communication device includes a base station; and
communicate the first communication signal by:
transmitting, to the base station, the first communication signal using at least the portion of the first set of interlaced frequency resource blocks within the first bandwidth part of the plurality of bandwidth parts based on the first LBT result.

23. The apparatus of claim 22, wherein the apparatus is further configured to:
perform an LBT, wherein the first LBT result is based on the LBT performed by the apparatus.

24. The apparatus of claim 13, wherein the apparatus is further configured to:
communicate the first configuration by:
transmitting, to the first wireless communication device, the first configuration indicating the plurality of bandwidth parts in the frequency band, wherein the first wireless communication device includes a user equipment; and
communicate the first communication signal by:
receiving, from the user equipment, the first communication signal.

25. A non-transitory computer-readable medium having program code recorded thereon for operation on a first wireless communication device, the program code comprising:
code for causing the first wireless communication device to communicate, with a second wireless communication device, a first configuration indicating a plurality of bandwidth parts in a frequency band, the frequency band including at least a first set of interlaced frequency resource blocks interlaced with a second set of interlaced frequency resource blocks across the plurality of bandwidth parts, wherein the first set of interlaced frequency resource blocks and the second set of interlaced frequency resource blocks across the plurality of bandwidth parts are defined with respect to a common frequency resource block; and
code for causing the first wireless communication device to communicate, with the second wireless communication device, a first communication signal using at least a portion of the first set of interlaced frequency resource blocks within a first bandwidth part of the plurality of bandwidth parts based on a first listen-before-talk (LBT) result.

26. The non-transitory computer-readable medium of claim 25, wherein the first set of interlaced frequency resource blocks are uniformly spaced apart from each other in the frequency band.

27. The non-transitory computer-readable medium of claim 25, further comprising:
code for causing the first wireless communication device to determine a reference starting subcarrier in the frequency band for a plurality of resource blocks, wherein the plurality of resource blocks includes the first set of interlaced frequency resource blocks and the second set of interlaced frequency resource blocks.

28. The non-transitory computer-readable medium of claim 27, further comprising:
code for causing the first wireless communication device to determine a plurality of guard bands for the plurality of bandwidth parts,
wherein the code for causing the first wireless communication device to determine the reference starting subcarrier includes code for causing the first wireless communication device to determine the reference starting subcarrier based on a metric associated with a number of resource blocks in each bandwidth part that are non-overlapping with a resource block including a portion of the plurality of guard bands.

29. The non-transitory computer-readable medium of claim 28, wherein the code for causing the first wireless communication device to determine the plurality of guard bands further includes:
code for causing the first wireless communication device to determine the plurality of guard bands such that center frequencies of the plurality of channels are spaced apart from each other in the frequency band by an integer multiple of a subcarrier spacing.

30. The non-transitory computer-readable medium of claim 27, wherein the code for causing the first wireless communication device to determine the reference starting subcarrier includes code for causing the first wireless communication device to determine the reference starting subcarrier based on a guard band of a bandwidth part including a largest bandwidth among the plurality of bandwidth parts.

31. The non-transitory computer-readable medium of claim 27, wherein the code for causing the first wireless communication device to determine the reference starting subcarrier includes code for causing the first wireless communication device to determine the reference starting subcarrier based on a guard band of a bandwidth part including a smallest bandwidth among the plurality of bandwidth parts.

32. The non-transitory computer-readable medium of claim 25, further comprising:
code for causing the first wireless communication device to communicate, with a third wireless communication device, a second communication signal using at least a portion of the second set of interlaced frequency resource blocks within a second bandwidth part of the plurality of bandwidth parts based on a second LBT result,
wherein the second bandwidth part is at least partially overlapping with the first bandwidth part,
wherein the third wireless communication device is different from the second wireless communication device.

33. The non-transitory computer-readable medium of claim 25, wherein:
the code for causing the first wireless communication device to communicate the first configuration comprises:
code for causing the first wireless communication device to receive, from the second wireless communication device, the first configuration indicating the plurality of bandwidth parts in the frequency band, wherein the first wireless communication device includes a user equipment and the second wireless communication device includes a base station; and
the code for causing the first wireless communication device to communicate the first communication signal comprises:
code for causing the user equipment to transmit, to the base station, the first communication signal using at least the portion of the first set of interlaced frequency resource blocks within the first bandwidth part of the plurality of bandwidth parts based on the first LBT result.

34. The non-transitory computer-readable medium of claim 33, further comprising:
code for causing the user equipment to perform an LBT, wherein the first LBT result is based on the LBT performed by the user equipment.

35. The non-transitory computer-readable medium of claim 25, wherein:
the code for causing the first wireless communication device to communicate the first configuration comprises:
code for causing the first wireless communication device to transmit, to the second wireless communication device, the first configuration indicating the plurality of bandwidth parts in the frequency band, wherein the first wireless communication device includes a base station and the second wireless communication device includes a user equipment; and
the code for causing the first wireless communication device to communicate the first communication signal comprises:
code for causing the base station to receive, from the user equipment, the first communication signal.

36. A first wireless communication device, comprising:
means for communicating, with a second wireless communication device, a first configuration indicating a plurality of bandwidth parts in a frequency band, the frequency band including at least a first set of interlaced frequency resource blocks interlaced with a second set of interlaced frequency resource blocks across the plurality of bandwidth parts, wherein the first set of interlaced frequency resource blocks and the second set of interlaced frequency resource blocks across the plurality of bandwidth parts are defined with respect to a common frequency resource block; and
means for communicating, by the first wireless communication device with the second wireless communication device, a first communication signal using at least a portion of the first set of interlaced frequency resource blocks within a first bandwidth part of the plurality of bandwidth parts based on a first listen-before-talk (LBT) result.

37. The first wireless communication device of claim 36, further comprising:
means for determining, by the first wireless communication device, a reference starting subcarrier in the frequency band for a plurality of resource blocks, wherein the plurality of resource blocks includes the first set of interlaced frequency resource blocks and the second set of interlaced frequency resource blocks.

38. The first wireless communication device of claim 37, further comprising:
means for determining, by the first wireless communication device, a plurality of guard bands for the plurality of bandwidth parts, wherein the means for determining the reference starting subcarrier includes means for determining the reference starting subcarrier based on a metric associated with a number of resource blocks in each bandwidth part that are non-overlapping with a resource block including a portion of the plurality of guard bands.

39. The first wireless communication device of claim 37, wherein the means for determining the reference starting subcarrier includes:
means for determining the reference starting subcarrier based on a guard band of a bandwidth part, wherein the bandwidth part includes at least one of a largest bandwidth among the plurality of bandwidth parts or a smallest bandwidth among the plurality of bandwidth parts.

40. The first wireless communication device of claim 36, further comprising:
means for communicating, by the first wireless communication device with a third wireless communication device, a second communication signal using at least a portion of the second set of interlaced frequency resource blocks within a second bandwidth part of the plurality of bandwidth parts based on a second LBT result,
wherein the second bandwidth part is at least partially overlapping with the first bandwidth part,
wherein the third wireless communication device is different from the second wireless communication device.

41. The first wireless communication device of claim 36, wherein:
the means for communicating the first configuration comprises:
means for receiving, by the first wireless communication device from the second wireless communication device, the first configuration indicating the plurality of bandwidth parts in the frequency band, wherein the first wireless communication device includes a user equipment and the second wireless communication device includes a base station; and
the means for communicating the first communication signal comprises:
means for transmitting, by the user equipment to the base station, the first communication signal using at least the portion of the first set of interlaced frequency resource blocks within the first bandwidth part of the plurality of bandwidth parts based on the first LBT result.

42. The first wireless communication device of claim 36, wherein:
the means for communicating the first configuration comprises:
means for transmitting, by the first wireless communication device to the second wireless communication device, the first configuration indicating the plurality of bandwidth parts in the frequency band, wherein the first wireless communication device includes a base station and the second wireless communication device includes a user equipment; and
the means for communicating the first communication signal comprises:
means for receiving, by the base station from the user equipment, the first communication signal.

* * * * *